(12) United States Patent
Kikuchi et al.

(10) Patent No.: US 7,840,118 B2
(45) Date of Patent: Nov. 23, 2010

(54) RECORDING MEDIUM, RECORDING APPARATUS AND RECORDING METHOD FOR RECORDING DATA INTO RECORDING MEDIUM, AND REPRODUCING APPARATUS AND REPRODUCING METHOD FOR REPRODUCING DATA FROM RECORDING MEDIUM

(75) Inventors: Shinichi Kikuchi, Yokohama (JP); Kazuhiko Taira, Yokohama (JP); Tomoaki Kurano, Yokohama (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1112 days.

(21) Appl. No.: 11/504,085

(22) Filed: Aug. 15, 2006

(65) Prior Publication Data

US 2007/0036520 A1 Feb. 15, 2007

Related U.S. Application Data

(60) Division of application No. 10/224,354, filed on Aug. 21, 2002, now Pat. No. 7,295,758, which is a division of application No. 09/785,161, filed on Feb. 20, 2001, now abandoned, which is a continuation of application No. 09/392,788, filed on Sep. 9, 1999, now abandoned, which is a continuation of application No. 09/005,027, filed on Jan. 12, 1998, now abandoned, which is a division of application No. 08/630,250, filed on Apr. 10, 1996, now Pat. No. 6,134,383.

(30) Foreign Application Priority Data

Apr. 11, 1995 (JP) .................................. 07-085693

(51) Int. Cl.
*H04N 5/91* (2006.01)

(52) U.S. Cl. ............................ 386/95; 386/96; 386/125
(58) Field of Classification Search .................. 386/46, 386/95, 96, 98, 125, 126
See application file for complete search history.

(56) References Cited

U.S. PATENT DOCUMENTS 4,586,027 A 4/1986 Tsukiyama et al.

(Continued)

FOREIGN PATENT DOCUMENTS

| EP | 381807 A2 | 8/1990 |
|---|---|---|
| EP | 521487 A1 | 1/1993 |
| EP | 635835 A2 | 1/1995 |
| EP | 664646 A2 | 7/1995 |
| EP | 245904 A1 | 11/1997 |
| WO | WO 94/07332 | 3/1994 |

OTHER PUBLICATIONS

ISO/IEC 13818, 1994 Information Technology-Generic Coding of Moving Pictures and Associated Audio, p. 36.

*Primary Examiner*—Huy T Nguyen
(74) *Attorney, Agent, or Firm*—Oblon, Spivak, McClelland, Maier & Neustadt, L.L.P.

(57) ABSTRACT

Data is recorded in a data area of a disk in a hierarchical structure of program chains, programs, cells and packs, each pack is constructed by a pack header for identifying the pack and a packet having a data stream recorded therein, the packet has a packet header having a stream ID indicating at least a private stream and a sub-stream ID indicating the classification of the private stream described therein, and the classification indicates packet data of Dolby AC3 audio data, packet data of linear audio data, packet data of sub-picture data, or packet data of computer data.

5 Claims, 32 Drawing Sheets

U.S. PATENT DOCUMENTS

| | | |
|---|---|---|
| 4,602,295 A | 7/1986 | Moriyama et al. |
| 4,604,655 A | 8/1986 | Moriyama |
| 4,680,647 A | 7/1987 | Moriyama |
| 4,707,818 A | 11/1987 | Suzuki et al. |
| 4,914,523 A | 4/1990 | Maruta |
| 4,979,159 A | 12/1990 | Tsuruoka et al. |
| 5,130,816 A | 7/1992 | Yoshio |
| 5,138,925 A | 8/1992 | Koguchi et al. |
| 5,150,113 A | 9/1992 | Bluthgen |
| 5,166,804 A | 11/1992 | Takahashi |
| 5,224,087 A | 6/1993 | Maeda et al. |
| 5,233,478 A | 8/1993 | Kanota |
| 5,400,077 A | 3/1995 | Cookson et al. |
| 5,424,850 A | 6/1995 | Inoue et al. |
| 5,448,368 A | 9/1995 | Rijckaert et al. |
| 5,455,684 A | 10/1995 | Fujinami et al. |
| 5,463,565 A | 10/1995 | Cookson et al. |
| 5,533,021 A | 7/1996 | Branstad et al. |
| 5,535,008 A | 7/1996 | Yamagishi et al. |
| 5,550,593 A | 8/1996 | Nakabayashi |
| 5,568,274 A | 10/1996 | Fujinami et al. |
| 5,583,654 A | 12/1996 | Oguro |
| 5,587,979 A | 12/1996 | Bluthgen |
| 5,592,450 A | 1/1997 | Yonemitsu et al. |
| 5,596,564 A | 1/1997 | Fukushima et al. |
| 5,619,338 A | 4/1997 | Nakai et al. |
| 5,627,656 A | 5/1997 | Sonohara et al. |
| 5,642,338 A | 6/1997 | Fukushima et al. |
| 5,646,796 A | 7/1997 | Kimura et al. |
| 5,646,931 A | 7/1997 | Terasaki |
| 5,671,226 A | 9/1997 | Murakami et al. |
| 5,687,276 A | 11/1997 | Oguro et al. |
| 5,708,659 A | 1/1998 | Rostoker et al. |
| 5,819,004 A | 10/1998 | Azadegan et al. |
| 5,872,784 A | 2/1999 | Rostoker et al. |
| 7,315,690 B2 * | 1/2008 | Kikuchi et al. ............... 386/95 |

* cited by examiner

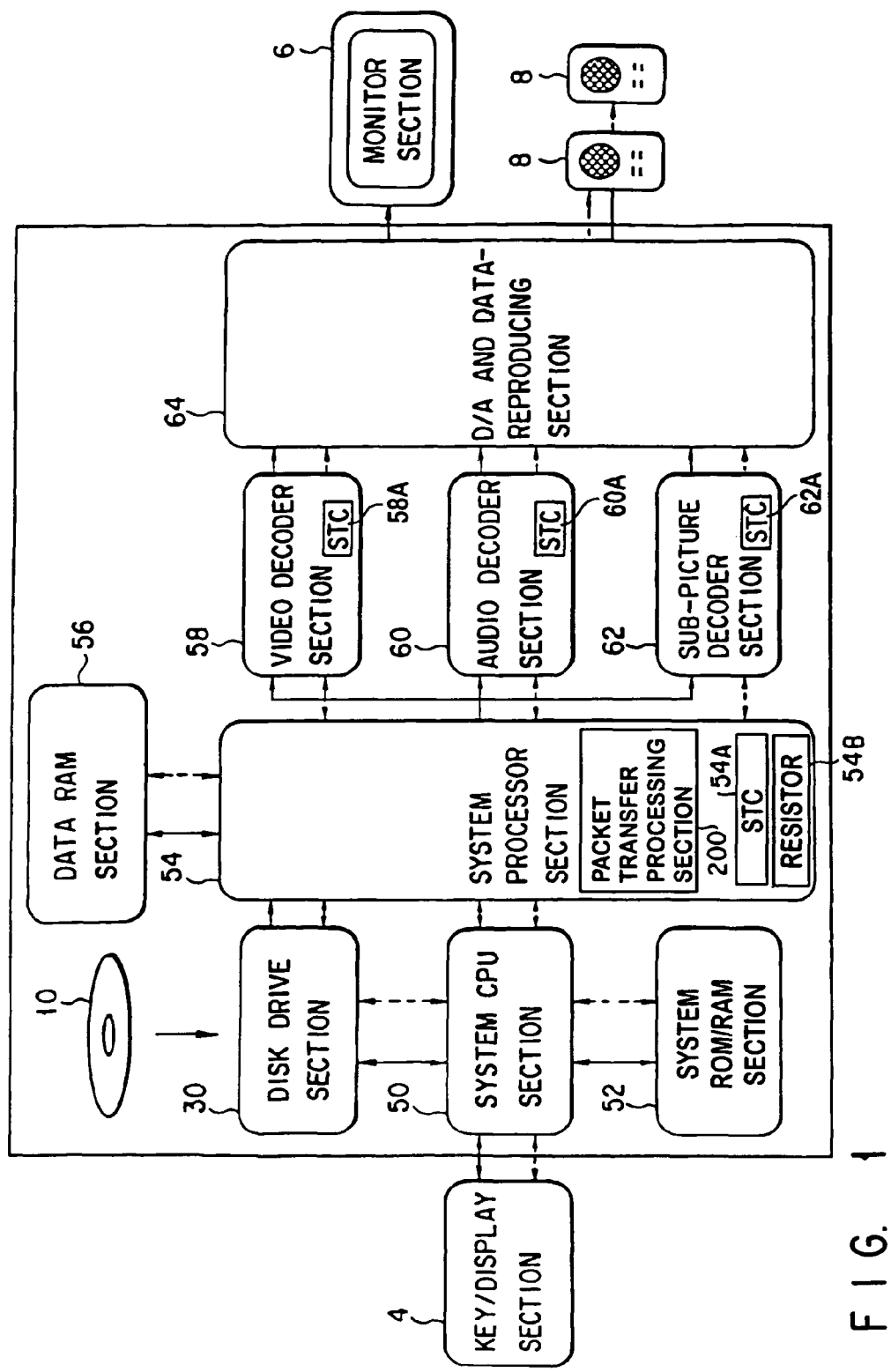
F I G. 1

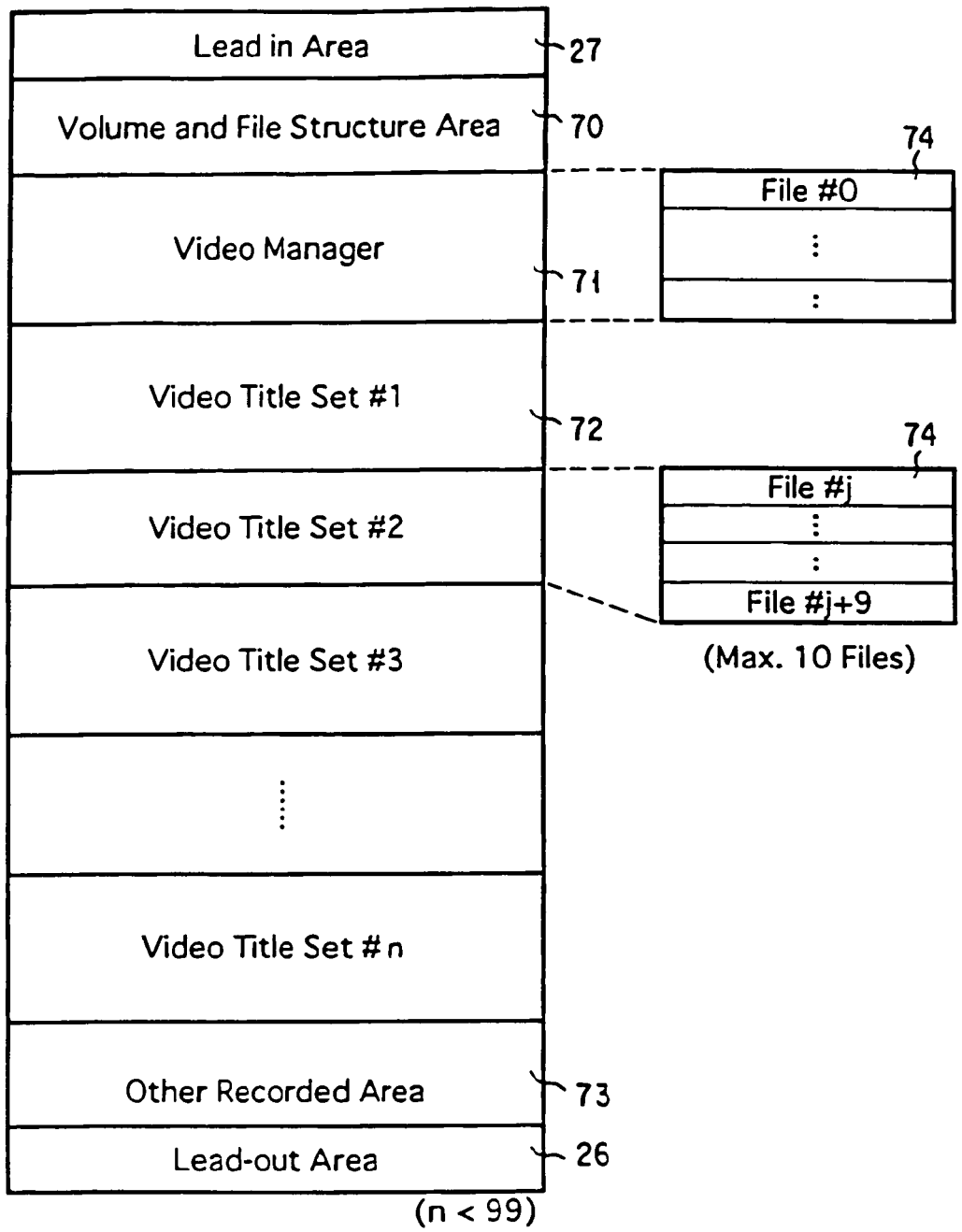
F I G. 4

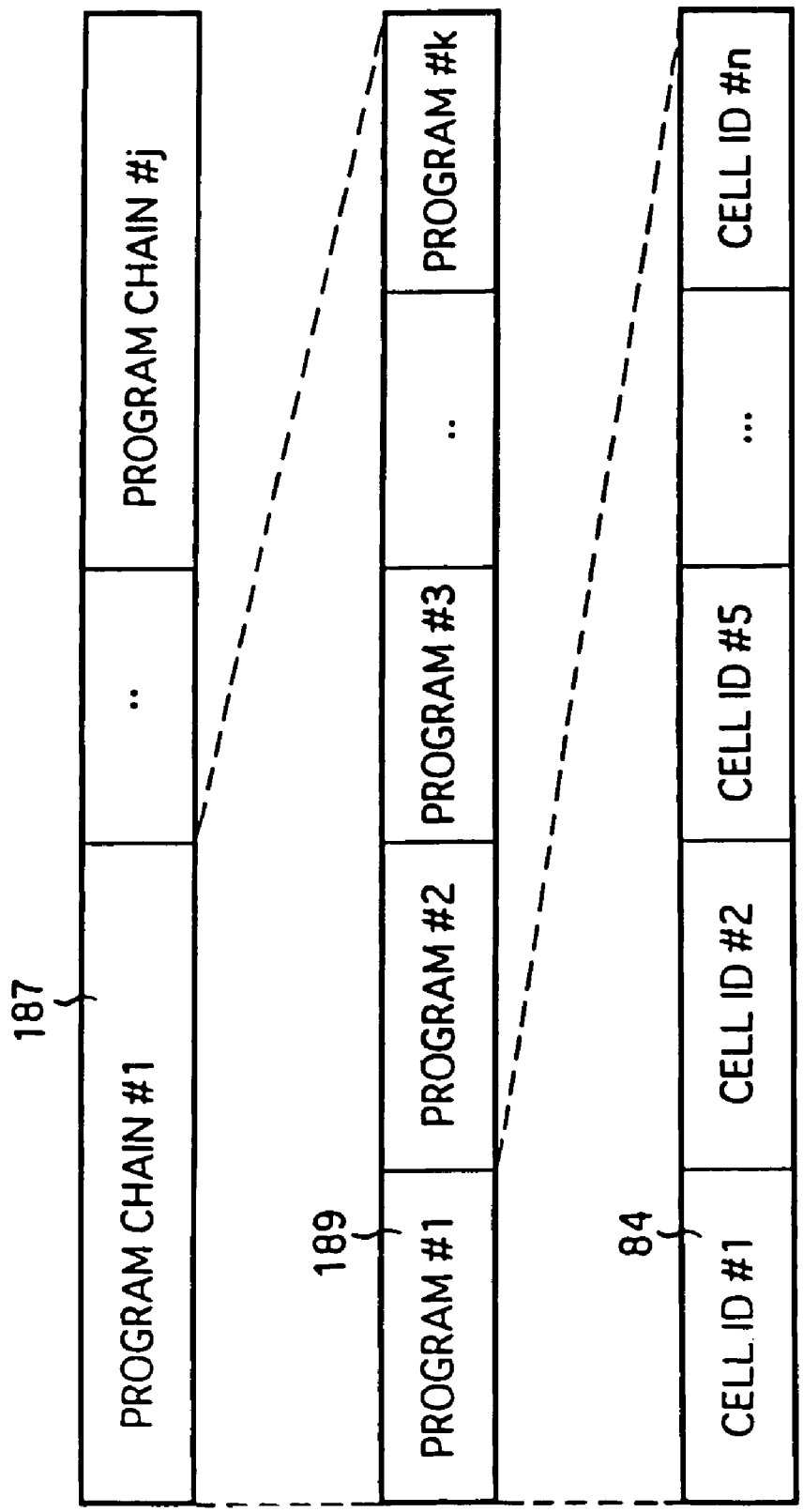
F I G. 7

FIG. 8

| VMGI MAT | Content | (Description order) |
|---|---|---|
| VMG_ID | Video Manager Identifier | |
| VMGI_SZ | Size of Video Manager Information | |
| VERN | Version Number of DVD Video Specification | |
| VMG_CAT | Video Manager Category | |
| VLMS_ID | Volume Set Identifier | |
| VTS_Ns | Number of Video Title Set | |
| PVR_ID | Provider Unique ID | |
| VMGM_VOBS_SA | Video Manager Menu Video Object Set Start Address | |
| VMGI_MAT_EA | End Address of VMGI_MAT | |
| TT_SRPT_SA | Start Address of TT_SRPT | |
| VTS_ATRT_SA | Start Address of VTS_ATRT | |
| VMGM_V_ATR | Video Attribute of VMGM | |
| VMGM_AST_Ns | Number of Audio Stream of VMGM | |
| VMGM_AST_ATR | Audio Stream Attribute of VMGM | |
| VMGM_SPST_Ns | Number of Sub-picture Stream of VMGM | |
| VMGM_SPST_ATR | Sub-picture Stream Attribute of VMGM | |

TT_SRPT

| TT_SRPTI | (Description order) |
|---|---|
| | Content |
| EN_PGC_Ns | Number of Entry PGC |
| TT_SRPT_EA | End Address of TT_SRPT |

| TT_SRP | (Description order) |
|---|---|
| | Content |
| VTSN | Video Title Set Number |
| PGCN | Program Chain Number |
| VTS_SA | Start Address of Video Title Set |

| VTSI_MAT | Content | (Description order) |
|---|---|---|
| VTS_ID | Video Title Set Identifier | |
| VTS_SZ | Size of the VTS | |
| VERN | Version Number of DVD_Video Specification | |
| VTS_CAT | Video Title Set Category | |
| VTSM_VOB_SA | Start Address of VTSM_VOBS | |
| VTSTT_VOB_SA | Start Address of VTSTT_VOBS | |
| VTI_MAT_EA | End Address of VTSI_MAT | |
| VTS-DAPT-SA | Start Address of VTS_DAPT | |
| VTS_PGCIT_SA | Start Address of VTS_PGCIT | |
| VTS_PGCIT_UT_SA | Start Address of VTS_PGCIT_UT | |
| VTS_MAPT_SA | Start Address of VTS_MAPT | |
| VTS_V_ATR | Video Attribute | |
| VTS_AST_Ns | Number of Audio Streams for VTS | |
| VTS_AST_ATR | Audio Stream Attribute for VTS | |
| VTS_SPST_Ns | Number of Sub-picture Streams for VTS | |
| VTS_SPST_ATR | Sub-picture Stream Attribute for VTS | |
| VTSM_AST_Ns | Number of Audio Streams for VTSM | |
| VTSM_AST_ATR | Audio Stream Attribute for VTSM | |
| VTS_SPST_Ns | Number of Sub-picture Streams for VTSM | |
| VTS_SPST_ATR | Sub-picture Stream Attribute for VTSM | |

F I G. 13

VTS_PGCIT

VTS_PGCIT_I
| | (Description order) |
|---|---|
| | Content |
| VTS_PGC_Ns | Number of VTS_PGCs |
| VTS_PGCIT_EA | End Address of VTS_PGCCIT |
F I G. 15
VTS_PGCIT_SRP
| | (Description order) |
|---|---|
| | Content |
| VTS_PGC_CAT | Video Title Set PGC category |
| VTS_PGCI_SA | Start Address of VTS_PGC Information |
F I G. 16
VTS_PGCI
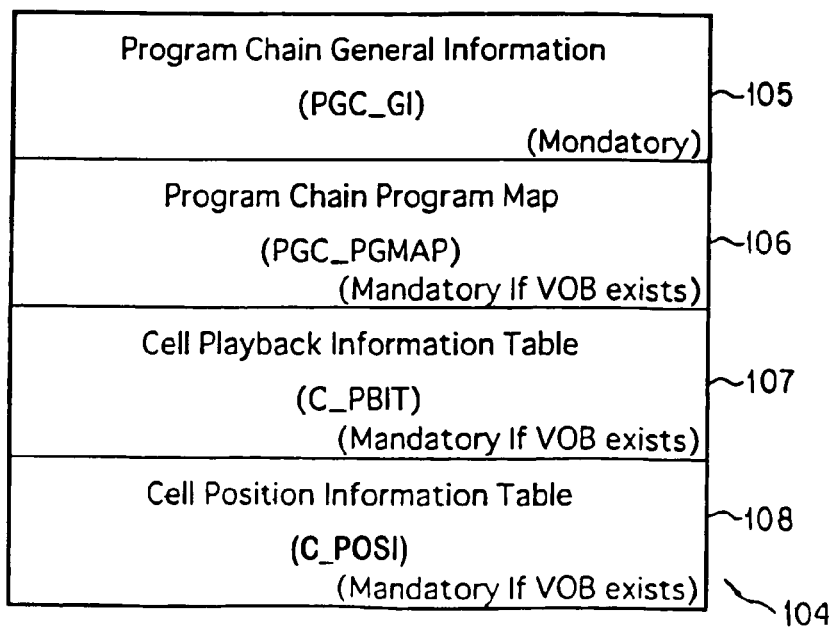
F I G. 17

PGC_GI

| | (Description order) |
|---|---|
| | Content |
| PGCI_CAT | PGC Category |
| PGC_CNT | PGC Content |
| PGC_PB_TIME | PGC Playback Time |
| PGC_SPST_CTL | PGC-Sub-picture Stream Control |
| PGC_AST_CTL | PGC Audio Stream Control |
| PGC_SP_PLT | PGC Sub-picture Palette |
| C_PBIT_SA | Start Address of C_PBIT |
| C_POSIT_SA | Start Address of C_POSIT |

F I G. 18

PGC_PGMAP

| Entry Cell Number for Program #1 |
|---|
| Entry Cell Number for Program #2 |
| : |
| : |
| Entry Cell Number for Program #n |

106

F I G. 19

Entry cell number

| | Content |
|---|---|
| ECELLN | Entry Cell Number |

F I G. 20

C_PBIT

| Cell Playback Information #1 (C_PBI1) |
|---|
| Cell Playback Information #2 (C_PBI2) |
| : |
| : |
| Cell Playback Information #n (C_PBIn) |

107

F I G. 21

C_PBI
|  | Content |
|---|---|
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
F I G. 22
C_POSI
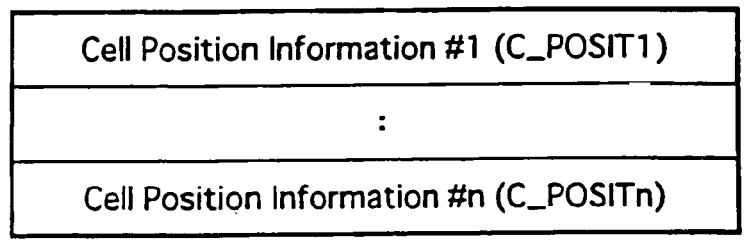
108
F I G. 23
C_POSI
|  | Content |
|---|---|
| C_VOB_IDN | VOB ID Number of Cell |
| C_IDN | Cell ID Number of the Cell |
F I G. 24

| PCI | |
|---|---|
| | Content |
| PCI_GI | PCI General Information |
| NSLS_ANGLI | Angle Information |

FIG. 27

| PCI_GI | |
|---|---|
| | Content |
| NV_PCK_LBN | LBN of NV Pack |
| VOBU_CAT | Category of VOBU |
| VOBU_SPTS | Start PTS of VOBU |
| VOBU_EPTS | End PTS of VOBU |

FIG. 28

| DSI | |
|---|---|
| | Content |
| DSI_GI | DSI General Information |
| SML_AGLI | Angle Information |
| VOBU_SI | VOB Search Information |
| SYNCI | Synchronus Playback Information |

FIG. 29

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

FIG. 30

| SYNCI | |
|---|---|
| | Content |
| A_SYNCA 0 to 7 | Target Audio Pack Address |
| SP_SYNCA 0 to 31 | VOBU Start Address of Target SP pack |

FIG. 31

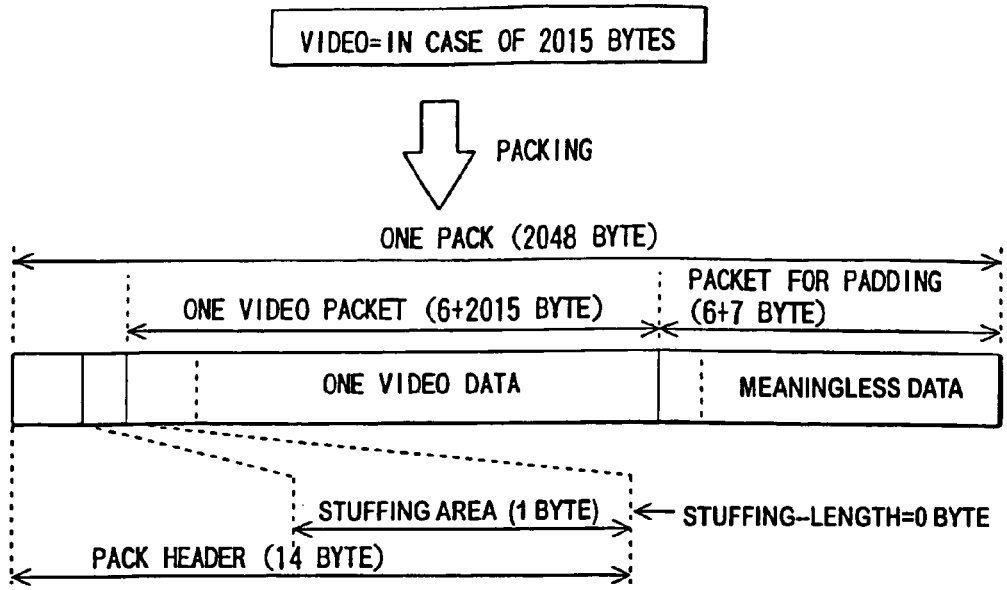
F I G. 34
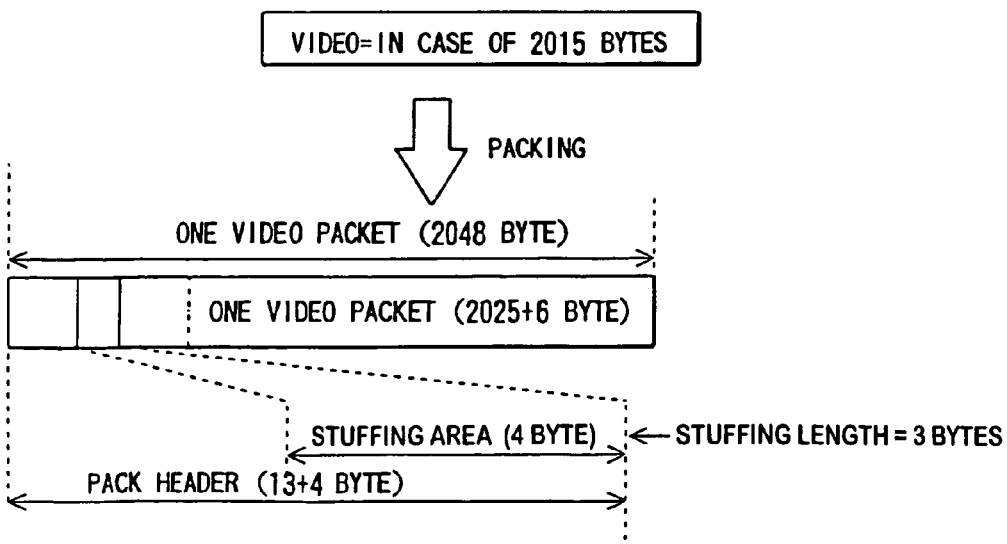
F I G. 35

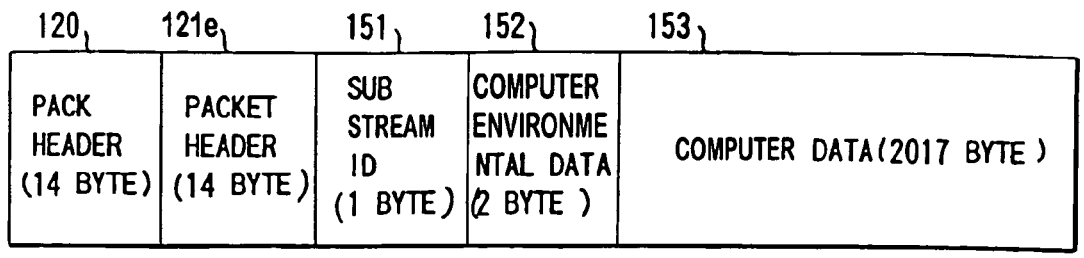
FIG. 39
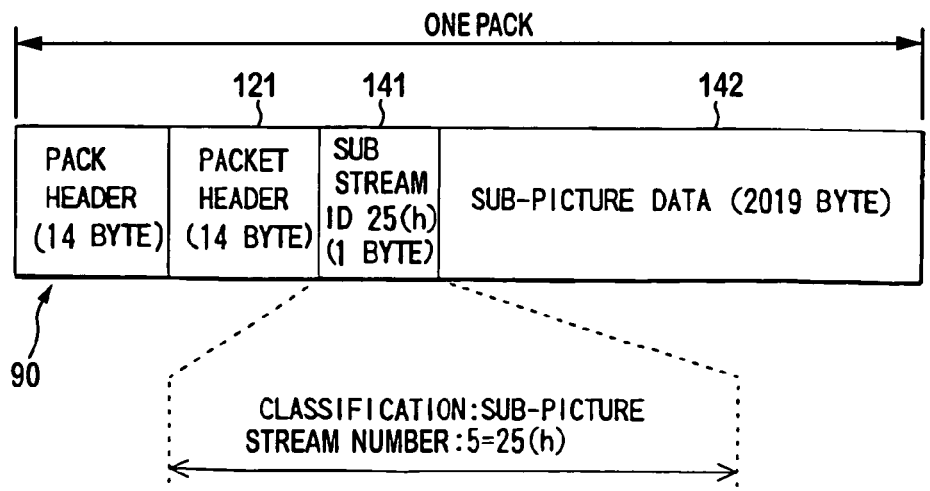
FIG. 40
FIG. 46

FIG. 41

| STREAM CODING | STREAM ID | COMMENT |
|---|---|---|
| PROGRAM STREAM MAP | 10111100 | |
| PRIVATE STREAM 1 | 10111101 | |
| PADDING STREAM | 10111110 | DUMMY DATA |
| PRIVATE STREAM 2 | 10111111 | |
| MPEG AUDIO STREAM | 110xxxxx | xxxxx=STREAM NUMBER |
| MPEG VIDEO STREAM | 1110xxxx | |
| ENTITLEMENT CONTROL MESSAGE | 11110000 | |
| ENTITLEMENT MANAGEMENT MESSAGE | 11110001 | |
| DSM CONTROL COMMAND | 11110010 | |
| PROGRAM・STREAM・DIRECTRY | 11111111 | |

SUB-STREAM ID FOR PRIVATE STREAM 1
| CLASSIFICATION STREAM CODING | SUB-STREAM ID (b) | COMMENT |
|---|---|---|
| LINEAR PCM AUDIO STREAM | 10100xxx | xxx-STREAM NUMBER |
| SUB-PICTURE STREAM | 001xxxxx | xxxxx-STREAM NUMBER |
| COMPUTER STREAM | 11000000 | |
| DOLBY AC-3 AUDIO STREAM | 10000xxx | xxx-STREAM NUMBER |
F I G. 42
SUB-STREAM ID FOR PRIVATE STREAM 2
| STREAM CODING | SUB-STREAM ID (b) |
|---|---|
| PCI STREAM | 00000000 |
| DSI STREAM | 00000001 |
F I G. 43
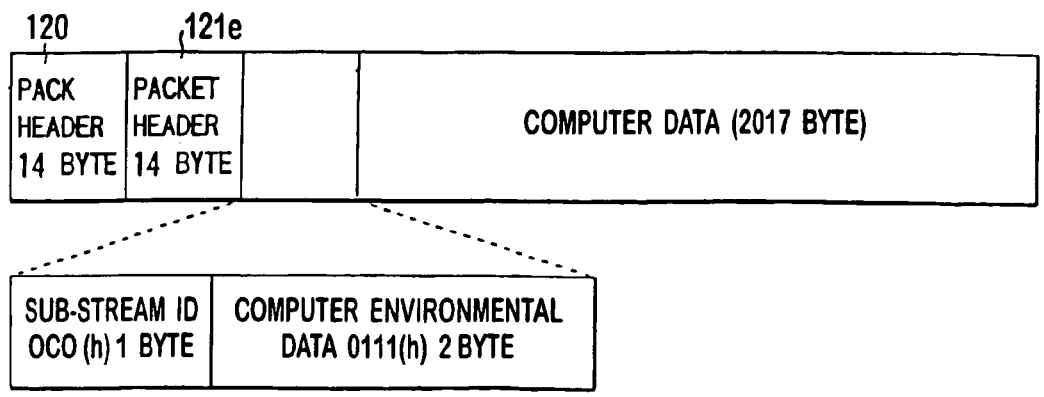
F I G. 45

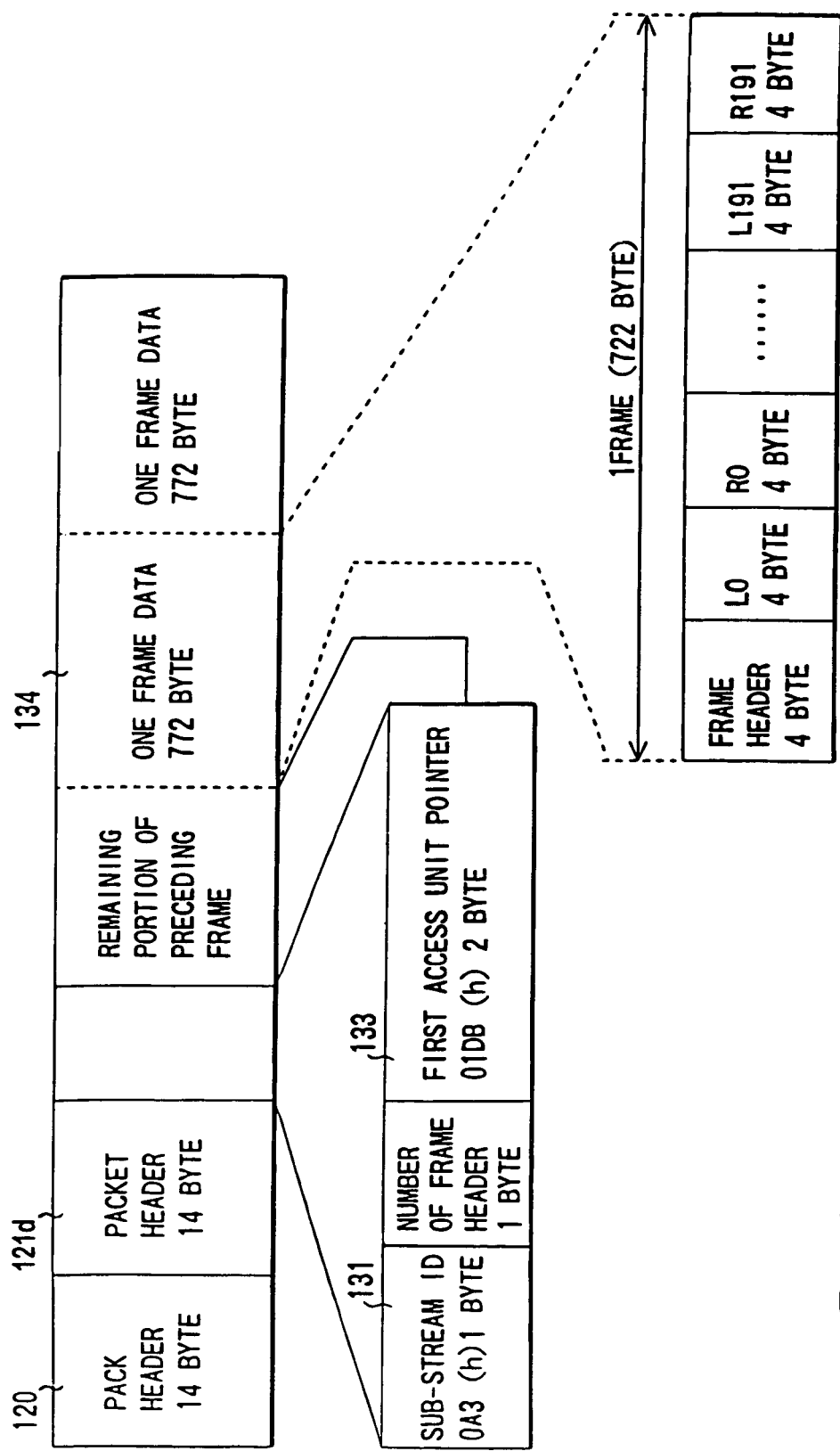
F I G. 44

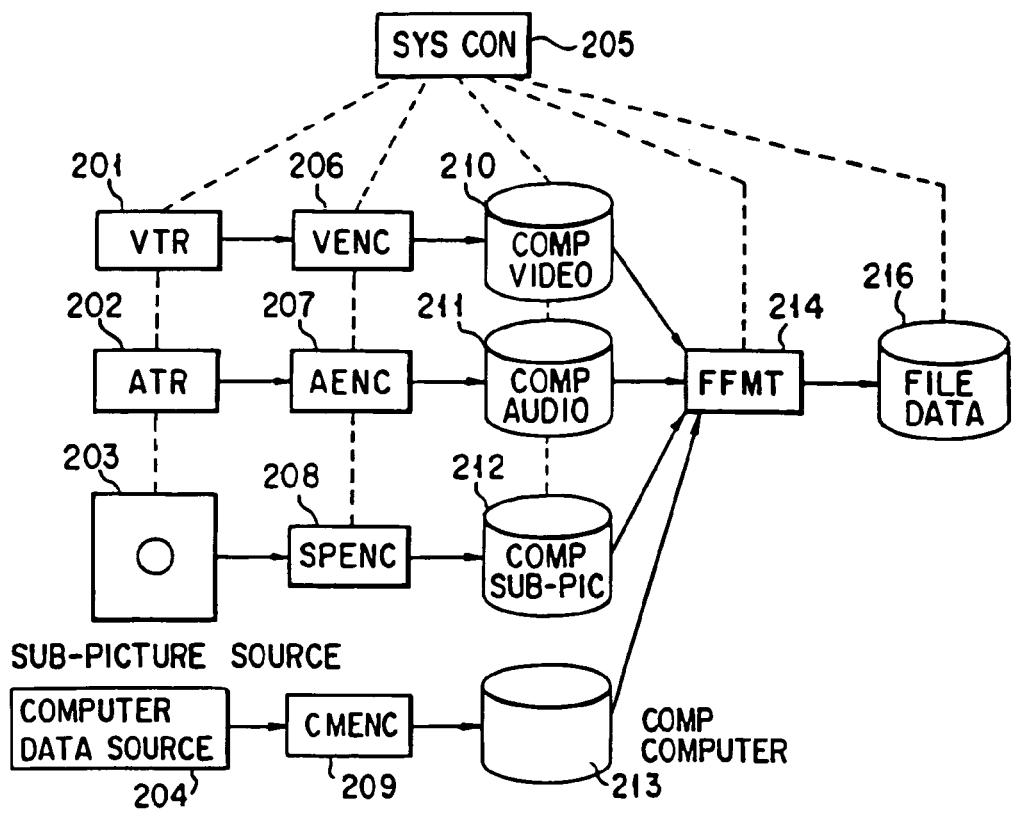
F I G. 50
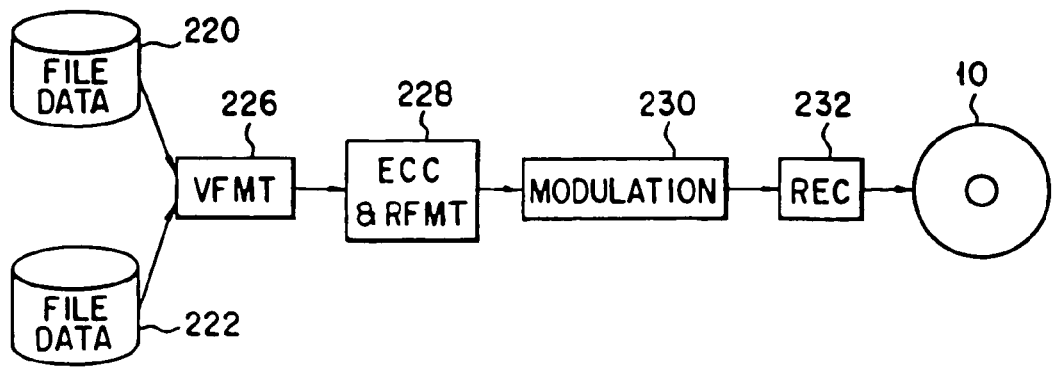
F I G. 53

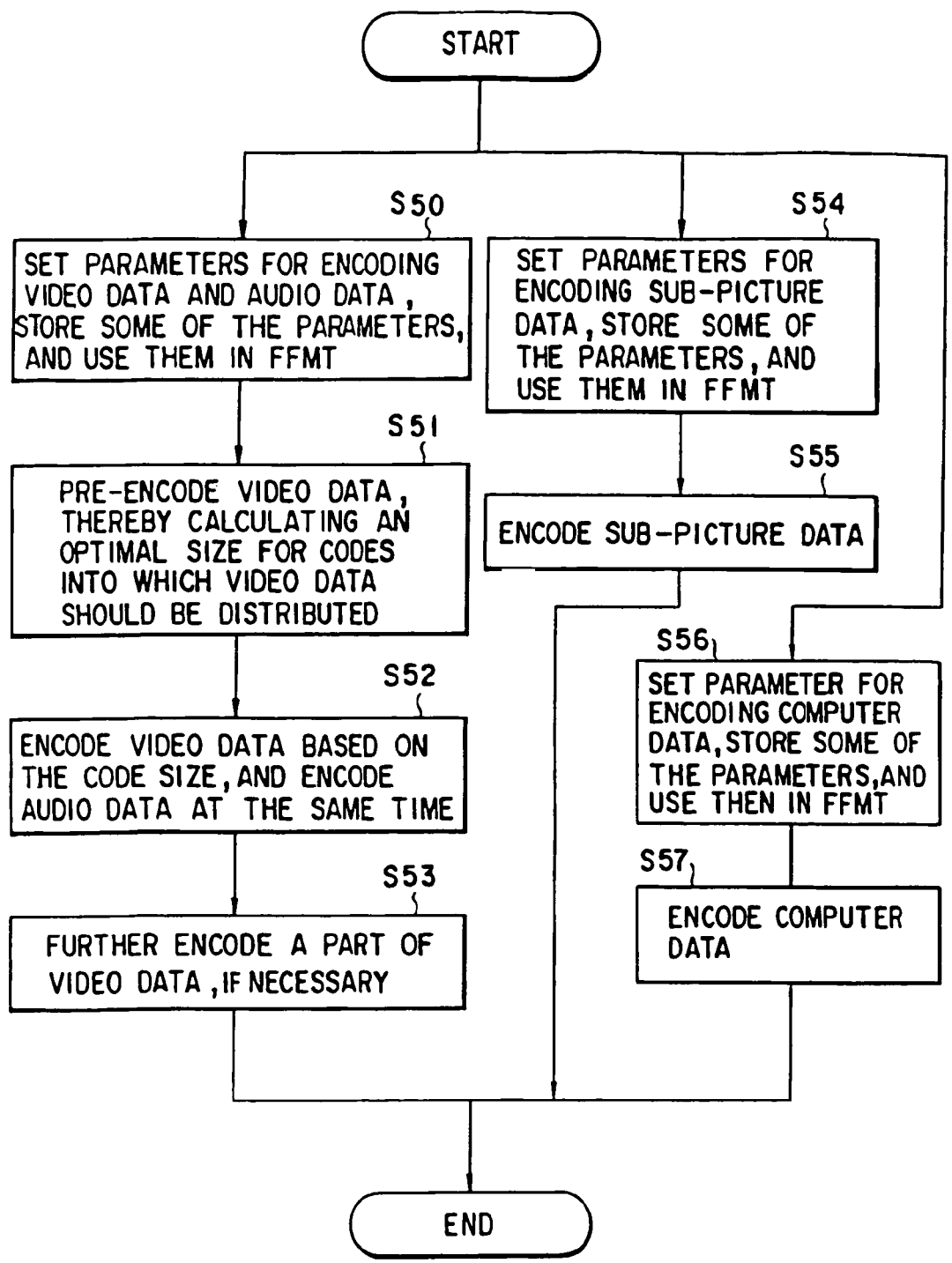
F I G. 51

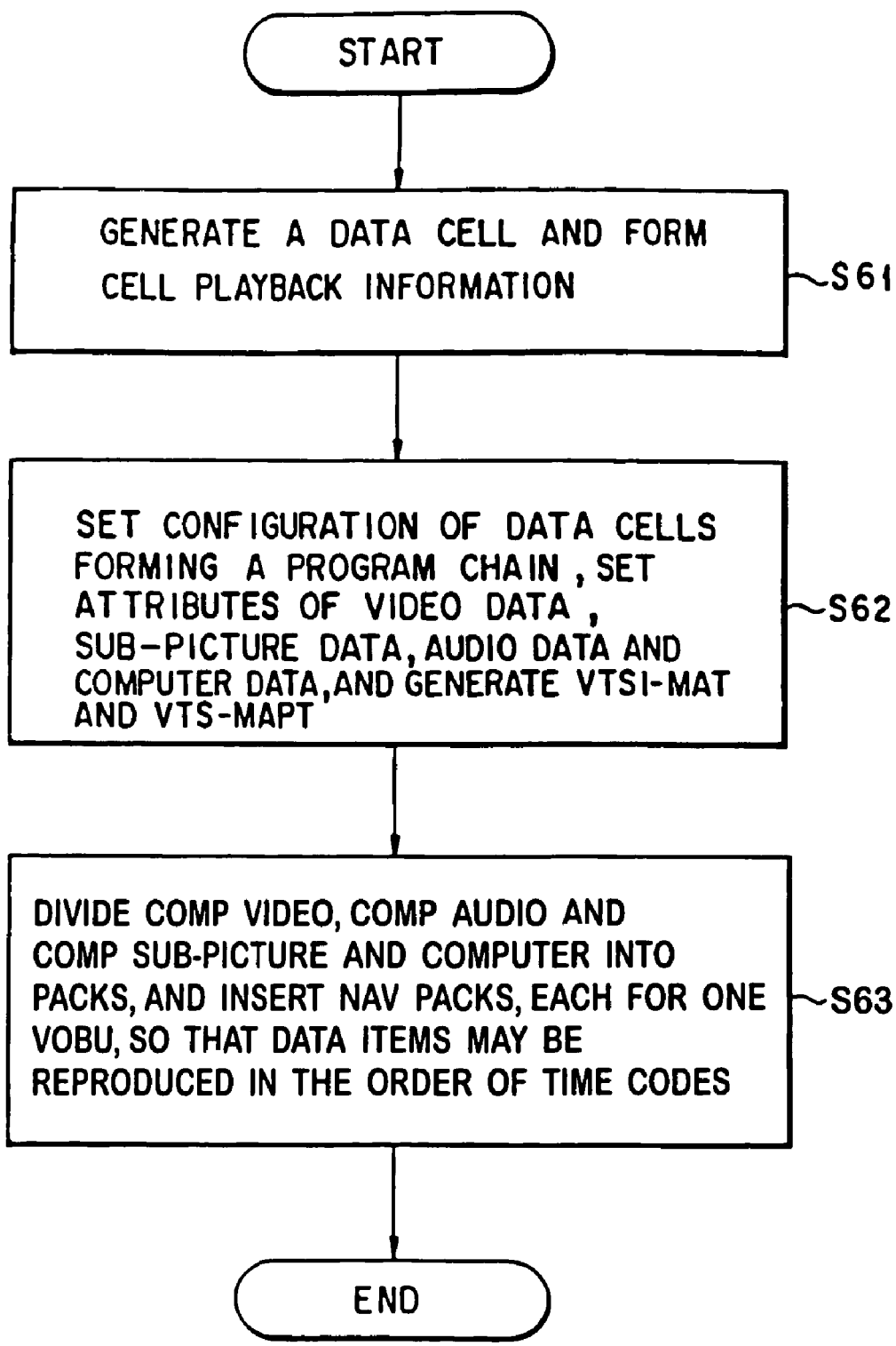
F I G. 52

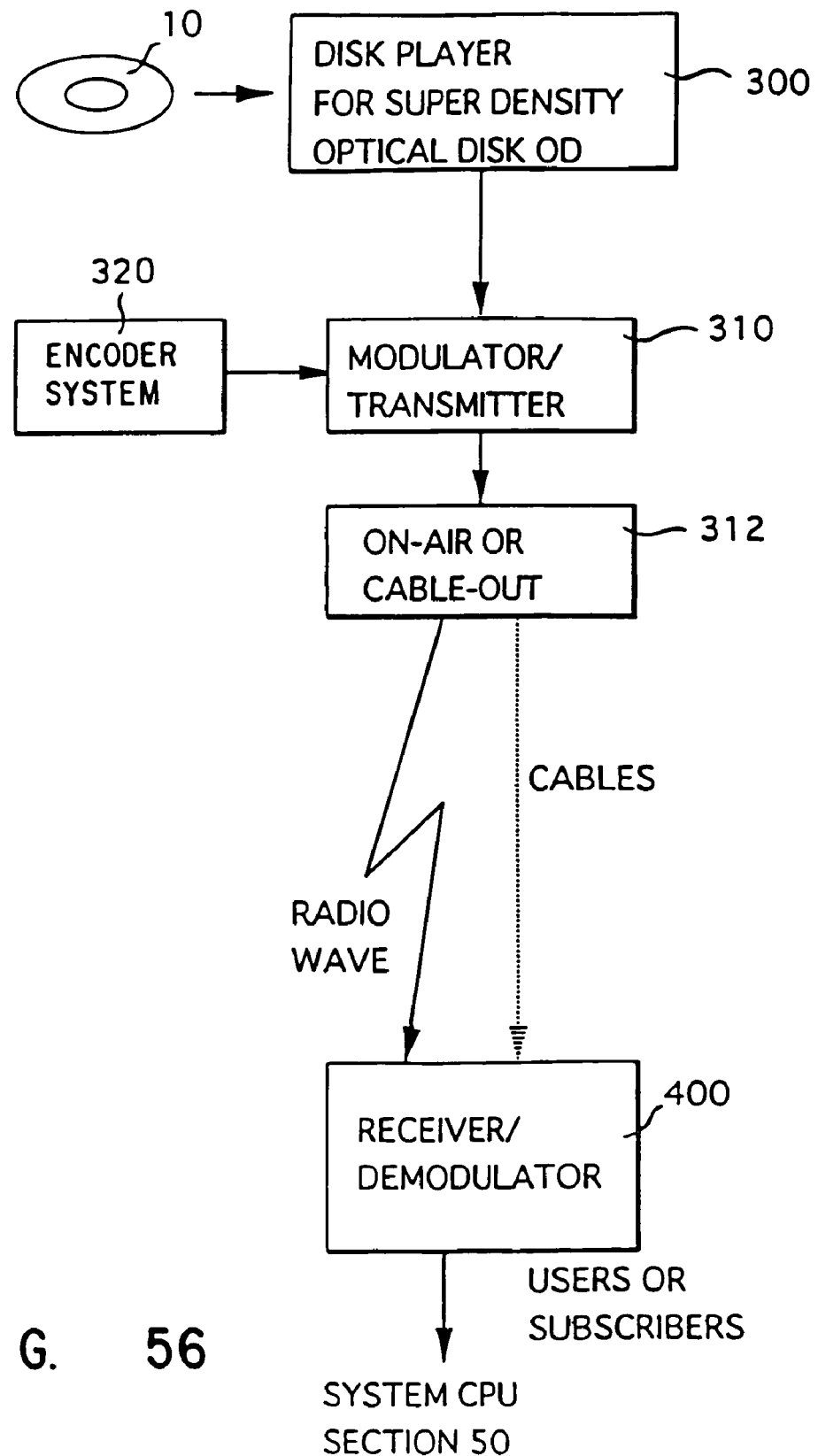
F I G. 56

RECORDING MEDIUM, RECORDING APPARATUS AND RECORDING METHOD FOR RECORDING DATA INTO RECORDING MEDIUM, AND REPRODUCING APPARATUS AND REPRODUCING METHOD FOR REPRODUCING DATA FROM RECORDING MEDIUM

CROSS REFERENCE TO RELATED APPLICATIONS

This application is a divisional of U.S. application Ser. No. 10/224,354, filed on Aug. 21, 2002, now U.S. Pat. No. 7,295,758 and for which priority is claimed under 35 U.S.C. §121. U.S. application Ser. No. 10/224,354 is a divisional of application Ser. No. 09/785,161, filed on Feb. 20, 2001, now abandoned, which is a continuation of application Ser. No. 09/392,788, filed Sep. 9, 1999, now abandoned, which is a continuation of application Ser. No. 09/005,027, filed on Jan. 12, 1998, now abandoned, which is a divisional of application Ser. No. 08/630,250, filed on Apr. 10, 1996, now U.S. Pat. No. 6,134,383, and for which priority is claimed under 35 U.S.C. §121 & 35 U.S.C. §120. This application is based upon and claims the benefit of priority under 35 U.S.C. §119 from the prior Japanese Patent Application No. 07-085693, filed on Apr. 11, 1995.

The entire contents of each of the above-identified applications for which priority is claimed is incorporated herein by reference in its entirety.

BACKGROUND OF THE INVENTION

1. Field of the Invention

This invention relates to a recording medium, such as an optical disk, for recording data items of different classifications used for different purposes, for example, compressed moving picture data and audio data, a recording apparatus for recording data into the recording medium, are cording method for recording data into the recording medium, a reproducing apparatus for reproducing data from the recording medium, and reproducing method for reproducing data from the recording medium.

2. Description of the Related Art

Conventionally, an MPEG (Moving Picture Experts Group) system is internationally standardized as a system for compressing (coding) digital moving picture image data and audio data. The MPEG compression system is a system for subjecting digital moving picture image data and audio data to the variable-length compression.

Further, the system format system corresponding to the MPEG compression system is defined as an MPEG system layer.

The MPEG system layer is defined so as to be easily dealt with in a communication system, and transfer starting time and reproduction starting time represented by using reference time are defined for moving picture data, audio data and other data so that the above data items can be transferred and reproduced in synchronism with one another.

Further, in the MPEG system layer, the data classifications of moving picture compressed data stream (MPEG moving picture data) and audio compressed data stream (MPEG audio data) are defined by use of stream ID, and the other data classifications can be defined by the user as a private stream.

However, in this case, the user can add but two kinds of data classification, and the expandability is limited.

As a result, it becomes impossible to deal with various classifications of data items and cope with a variety of conditions in the multimedia age.

Further, if a maximum data length is set for packets of data other than MPEG audio data and if the data length of the packet cannot be divided by the number of data items of a completed frame data block, the preceding data block will enter the packet and there occurs a possibility that the starting address of the frame data block cannot be determined, and when data is reproduced halfway, it may be impossible to reproduce the data.

SUMMARY OF THE INVENTION

An object of this invention is to make it possible to deal with various classifications of data items.

Further, another object of this invention is to make it possible to reproduce data halfway when data to be dealt with is linear audio data, and to make it possible to easily detect the environment in which data can be used when data to be dealt with is computer data.

According to this invention, there is provided a recording medium comprising a management area; and a data area, wherein data is divided into a plurality of program chains and recorded in the data area in a hierarchical structure in which each of the program chains is constructed by a plurality of programs, one program is constructed by a plurality of cells, and one cell is constructed by a plurality of packs, each pack is constructed-by-a pack header for identifying the pack and a packet having a data stream recorded therein, and the packet is constructed by a picket header having data indicating at least a private stream, data indicating the classification of the private stream, and packet data corresponding to the classification. Management data for managing the connection between the program chains, programs, cells and packs in the data area is recorded in the management area.

According to this invention, there is provided a recording medium comprising a management area and a data area, wherein a plurality of programs are recorded in the data area in a hierarchical structure in which one program is constructed by a plurality of packs, each pack is constructed by a pack header for identifying the pack and a packet having a data stream recorded therein, and the packet is constructed by a packet header having data indicating at least a private stream, data indicating the classification of the private stream, and packet data corresponding to the classification. Management data for managing the connection between the programs and packs in the data area is recorded in the management area.

According to this invention, there is provided a recording apparatus for recording data on a recording medium which includes a management area and a data area in which data is divided into a plurality of program chains and recorded in the data area in a hierarchical structure in which each of the program chains is constructed by a plurality of programs, one program is constructed by a plurality of cells, and one cell is constructed by a plurality of packs, each pack includes a pack header for identifying the pack and a packet having data recorded therein. The recording apparatus includes a reception means for receiving audio data or sub-picture data; first creating means for creating a pack by adding a pack header for identifying the pack to a packet which includes packet data constructed by frame data of part of audio data received by the reception means, a start address of the frame data, a stream number of the audio data and data indicating the audio data, and a packet header having a packet length and data indicating that the packet data is a private stream; second creating means for creating a pack by adding a pack header for identifying the pack to a packet which includes packet data constructed by part of sub-picture data received by the reception means, a stream number of the sub-picture data and data indicating the sub-picture data, and a packet header having a packet length and data indicating that the packet data is a private stream; and recording means for recording the pack created by the first and second creating means on the recording medium.

According to this invention, there is provided a recording apparatus for recording data on a recording medium which includes a management area and a data area and in which data is divided into a plurality of program chains and recorded in the data area in a hierarchical structure in which each of the program chains is constructed by a plurality of programs, one program is constructed by a plurality of cells, and one cell is constructed by a plurality of packs, each pack includes a pack header for identifying the pack and a packet having data recorded therein. The recording apparatus includes a reception means for receiving Dolby AC3 audio data, linear audio data, computer data or sub-picture data; first creating means for creating a pack by adding a pack header for identifying the pack to a packet which includes packet data constructed by frame data of part of Dolby AC3 audio data received by the reception means, a start address of the frame data, a stream number of the Dolby AC3 audio data and data indicating the Dolby AC3, audio data, and a packet header having a packet length and data indicating that the packet data is a private stream; second creating means for creating a pack by adding a pack header for identifying the pack to a packet which includes packet data constructed by frame data of part of linear audio data received by the reception means, a start address of the frame data, a stream number of the linear audio data and data indicating the linear audio data, and a packet header having a packet length and data indicating that the packet data is a private stream; third creating means for creating a pack by adding a pack header for identifying the pack to a packet which includes packet data constructed by part of computer data received by the reception means, environmental data of an application CPU and application OS of the computer data and data indicating the computer data, and a packet header having a packet length and data indicating that the packet data is a private stream; fourth creating means for creating a pack by adding a pack header for identifying the pack to a packet, which includes, packet data constructed by part of sub-picture data received by the reception means, a stream number of the sub-picture data and data indicating the sub-picture data, and a packet header having a packet length and data indicating that the packet data is a private stream; constructed by part of sub-picture data received by the first to fourth creating means on the recording medium.

According to this invention, there is provided a reproducing apparatus for reproducing recorded data for each pack from a recording medium which includes a management area formed in part of an area, and a data area formed in another area and in which data is divided into a plurality of program chains and recorded in the data area in a hierarchical structure in which each of the program chains is constructed by a plurality of programs, one program is constructed by a plurality of cells, and one cell is constructed by a plurality of packs, each pack includes a pack header for identifying the pack and a packet having data recorded therein. The reproducing apparatus includes a reading means for reading data for each pack on the recording medium; first determining means for determining whether or not data indicating a private stream is present in a packet header of a pack read by the reading means and determining data length; second determining means for determining whether data is audio data or sub-picture data according to classification data of a stream which is successively read when the first determining means has determined the private stream; first extraction means for extracting audio data in the pack data read by the reading means by an amount corresponding to the data length determined by the first determining means according to a start address of frame data which is successively read after the classification data of the stream when the second determining means has determined the audio data; second extraction means for extracting data in the pack data successively read by the reading means after the classification data of the stream by an amount corresponding to the data length determined by the first determining means when the second determining means has determined the sub-picture data; demodulating means for subjecting data extracted by the first or second extraction means to a demodulation process corresponding to classification of data determined by the second determining means; and output means for outputting data demodulated by the demodulating means.

According to this invention, there is provided a reproducing apparatus for reproducing recorded data for each pack from a recording medium which includes a management area formed in part of an area, and a data area formed in another area and in which data is divided into a plurality of program chains and recorded in the data area in a hierarchical structure in which each of the program chains is constructed by a plurality of programs, one program is constructed by a plurality of cells, and one cell is constructed by a plurality of packs, each pack includes a pack header for identifying the pack and a packet having data recorded therein. The reproducing apparatus includes a reading means for reading data for each pack on the recording medium; first determining means for determining whether or not data indicating a private stream is present in a packet header of a pack read by the reading means and determining data length; second determining means for determining whether data is DolbyAC3 audio data, linear audio data, computer data or sub-picture data according to classification data of a stream which is successively read when the first determining means has determined the private stream; first extraction means for extracting Dolby AC3 audio data or linear audio data in the pack data read by the reading means by an amount corresponding to the data length determined by the first determining means according to a start address of frame data which is successively read after the classification data of the stream when the second determining means has determined the Dolby AC3 audio data or linear audio data; second extraction means for extracting environmental data of application CPU and application OS successively read after the classification data of the stream and extracting data in the pack data successively read by the reading means after the environmental data by an amount corresponding to the data length determined by the first determining means when the second determining means has determined the computer data; third extraction means for extracting data in the pack data successively read by the reading means after the classification data of the stream by an amount corresponding to the data length determined by the, first determining means when the second determining means has determined the sub-picture data; demodulating means for subjecting data extracted by the first or third extraction means to a demodulation process corresponding to the classification of data determined by the second determining means; first output-means for outputting data demodulated by the demodulating means; and second output means for outputting program data extracted by the second extraction means and environmental data thereof.

Additional objects and advantages of the invention will be set forth in the description which follows, and in part will be obvious from the description, or may be learned by practice of the invention. The objects and advantages of the invention may be realized and obtained by means of, the instrumentalities and combinations particularly pointed out in the appended claims.

BRIEF DESCRIPTION OF THE DRAWINGS

The accompanying drawings, which reincorporated and constitute a part of the specification, illustrate a presently preferred embodiment of the invention and, together with the general description given above and the detailed description of the preferred embodiment given below, serve to explain the principles of the invention.

FIG. 1 is a schematic block diagram of an optical disk apparatus according to an embodiment of the present invention;

FIG. 4 shows the structure of the logic format of the optical disk of FIG. 3;

FIG. 7 is a diagram to help explain the structure of the video object unit of FIG. 6;

FIG. 8 shows the parameters and contents of the video manger information management table (VMGI_MAT) in the video manager (VMGI) of FIG. 5;

FIG. 13 shows the parameters and contents of the4video title set information management table (VTSI_NAT) the video title set information (VTSI) of FIG. 12;

FIG. 15 shows the parameters and contents of the information (VTS_PGCIT_I) in the video title set program chain information table (VTS_PGCIT) of FIG. 14;

FIG. 16 shows the parameters and contents of the search pointer (VTS_PGCIT_SRP) corresponding to the program chain in the video title set program chain information table (VTS_PGCIT) of FIG. 14;

FIG. 17 illustrates the structure of the program chain information (VTS_PGCI) in the video set corresponding to the program chain in the video title set program chain information table (VTS_PGCIT) of FIG. 14;

FIG. 18 shows the parameters and contents of the program chain general information (PGC_GI) in the program chain information (VTS_PGCI) of FIG. 17;

FIG. 19 illustrates the structure of a program chain map (PGC_PGMAP) of the program chain information (VTS_PGCI) of FIG. 17;

FIG. 20 shows the parameters and contents of the entry cell numbers (ECELLN) corresponding to the programs written in the program chain map (PGC_PGMAP) of FIG. 19;

FIG. 21 illustrate the structure of the cell playback information table (C_PBIT) of the program chain information (VTS_PGCI) of FIG. 17;

FIG. 22 shows the parameters and contents of the cell playback information table (C_PBIT) of FIG. 21;

FIG. 23 illustrates the structure of the cell position information (C_POSI) in the program chain information (VTS_PGCI) of FIG. 18;

FIG. 24 shows the parameters and contents of the cell position information (C_POSI) of FIG. 23;

FIG. 27 shows the parameters and contents of the playback control information (PCI) in the navigation pack of FIG. 26;

FIG. 28 shows the parameters and contents of the general information (PCI_GI) in the playback control information (PCI) of FIG. 27;

FIG. 29 shows the parameters and contents of the disk search information (DSI) in the navigation pack of FIG. 26;

FIG. 30 shows the parameters and contents of the DSI general information (DSI_GI) in the disk search information of FIG. 29;

FIG. 31 shows the parameters and content of the synchronizing playback information (SYNCI) on-the video object (VOB) of FIG. 29;

FIG. 34 is a diagram for illustrating an example of adjustment in a case where the adjustment data length is seven bytes or more;

FIG. 35 is a diagram for illustrating an example of adjustment in a case where the adjustment data length is six bytes or less;

FIG. 39 is a diagram for illustrating the structure of a computer data pack;

FIG. 40 is a diagram for illustrating the environmental classification of computer data;

FIG. 41 is a diagram for illustrating the structure of stream ID;

FIG. 42 is a diagram for illustrating the content of sub-stream ID for private stream 1;

FIG. 43 is a diagram for illustrating the content of sub-stream ID for private stream 2;

FIG. 44 is a diagram for illustrating the structure of an audio pack and packet;

FIG. 45 is a diagram for illustrating the structure of a computer data pack and packet;

FIG. 46 is a diagram for illustrating the structure of a sub-picture pack and packet;

FIG. 50 is a block diagram of an encoder system that encodes the video data and generates a video file;

FIG. 51 is a flowchart for an encoding process of FIG. 50;

FIG. 52 is a flowchart for combining the main video data, audio data, and sup-picture data all encoded according to the flow of FIG. 51 to create a video data file;

FIG. 53 is a block diagram of a disk formatter system that records the formatted video files on an optical disk;

FIG. 56 is a schematic diagram of a system that transfers the video title set of FIG. 4 via a communication route.

DETAILED DESCRIPTION OF THE PREFERRED EMBODIMENT

Hereinafter, referring to the accompanying drawings, an optical disk reproducing apparatus according to an embodiment of the present invention will be explained.

Figure 2:
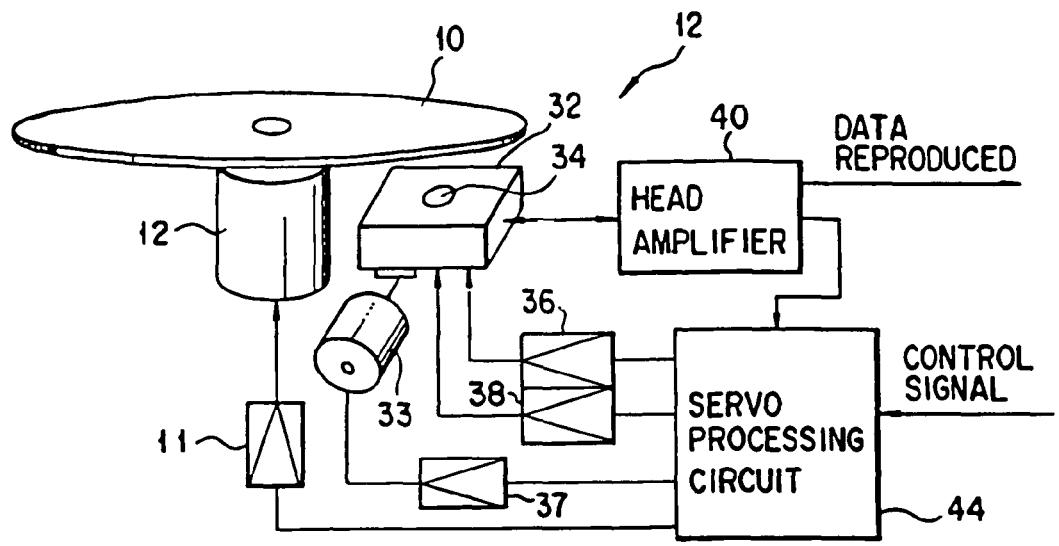
FIG. 2 is a detailed block diagram of the mechanical section of the disk drive unit of FIG. 1.
Figure 3:
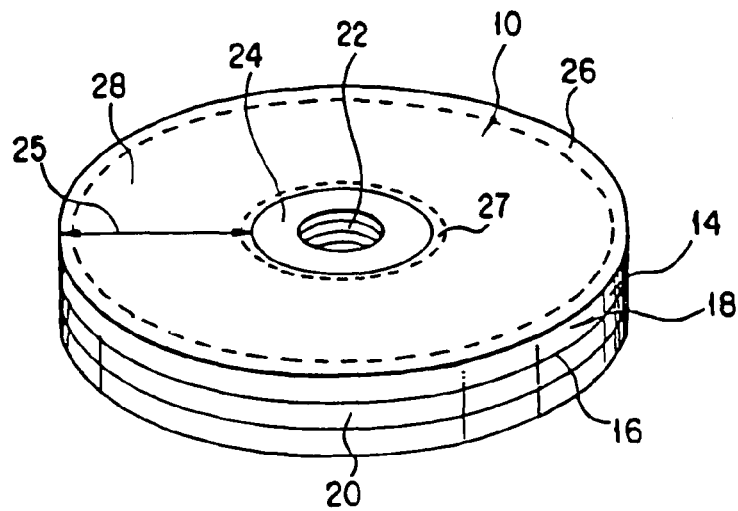
FIG. 3 is a schematic perspective view of-the structure of an optical disk loaded in the disk drive unit of FIG. 1.

FIG. 1 is a block diagram of an optical disk reproducing apparatus that reproduces the data from an optical disk associated with an embodiment of the present invention. FIG. 2 is a, block diagram of the, disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker, section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the video signals and the speaker section 8 generates sound according to the audio signals.

It is known that the optical disk 10 can have various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which management data, main video data, sub-picture data, and audio data are recorded in the form of pits (that is, in the form of changes in the physical state) as explained later. With the read-only optical disk 10, a train of pits is previously formed in the transparent substrate 14 by a stamper, a reflecting layer is formed by evaporation on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 60, a video decoder 58, an audio decoder section 60, a sub-picture decoder section 62, and a D/A and data reproducing section 64. The system processor section 54 is provided with a system time clock (STC) 54A and a register 54B. The video decoder section 58, audio decoder section 60, and sub-picture decoder section 62 are also provided with system time clocks (STC) 58A, 60A, 62A, respectively.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 across the radius of the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the above optical disk, the optical head 32 projects a laser beam on the optical disk 10 via the object lens 34. The object lens 34 is moved little by little across the radius of the optical disk 10 according to the driving signal supplied from the tracking circuit 38. Furthermore, the object lens 34 is moved along its optical axis according to the driving signal supplied from the focusing circuit 36 so that its focal point maybe positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and, a motor control signal and supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track at, for example, a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in a data RAM section 56 by the system processor section 54 which is controlled by the system CPU section 50, which is operated in accordance with the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal, an analog audio signal, and an analog sub-picture signal, subjects these signal to a mixing process, and supplies the resulting video signal and sub-picture signal to the monitor section 6 and the resulting audio signal to the speaker section 8. Then, on the basis of the video signal and sup-picture signal, an image is displayed on the monitor section 6 and according to the audio signal; sound is simultaneously reproduced from the speaker section 8.

The detailed operation of the optical disk apparatus of FIG. 1 will be described later with reference to the logic format of the optical disk explained below.

The data recording area 28 between the lead-in area 27 and the lead-out area 26 on the optical disk of FIG. 1 has a volume and file structure as shown in FIG. 4. The structure has been determined in conformity to specific logic format standards, such as Micro UDF or ISO 9660. The data recording area 28 is physically divided into a plurality of sectors as described earlier. These physical sectors are assigned serial numbers. In the following explanation, a logical address corresponds to a logical sector number (LSN) as determined in Micro UDF or ISO 9660. Like a physical sector, a logical sector contains 2048 bytes. The numbers (LSN) of logical sectors are assigned consecutively in ascending order as the physical sector number increments.

As shown in FIG. 4, the volume and file structure is a hierarchic structure and contains a volume and file structure area 70, a video manager 71, at least one video title set # 72, and another recorded area 73. These areas 70, 71, 72, 73 are aligned with the boundaries between logical sectors. As with a conventional CD, a logical sector is defined as a set of 2048 bytes. Accordingly, one logical sector corresponds to one logical block.

The volume and file structure area 70 corresponds to a management area determined in Micro UDF or ISO 9660. According to the description in the management area, the video manager 71 is stored in the system ROM/RAM section 52. As explained with reference to FIG. 5, the information used to manage video title sets 72 is written in the video manager 71, which is composed of a plurality of files, starting with file #0. In each video title set 72, compressed video data, compressed audio data, compressed sub-picture data, and the reproducing information about these data items are stored as explained later. Each video title set is composed of a plurality of piles 74. The number of video title sets 72 is limited to a maximum of 99. Furthermore, the number of files 74 (from file #j to file #j+9) constituting each video title set 72 is determined to be a maximum of 10. These files 72 are also aligned with the boundaries between logical sectors.

In the other recorded area 73, the information capable of utilizing the aforementioned video title sets 72 is recorded. The other recorded areas 73 are not necessarily provided.

Figure 5:
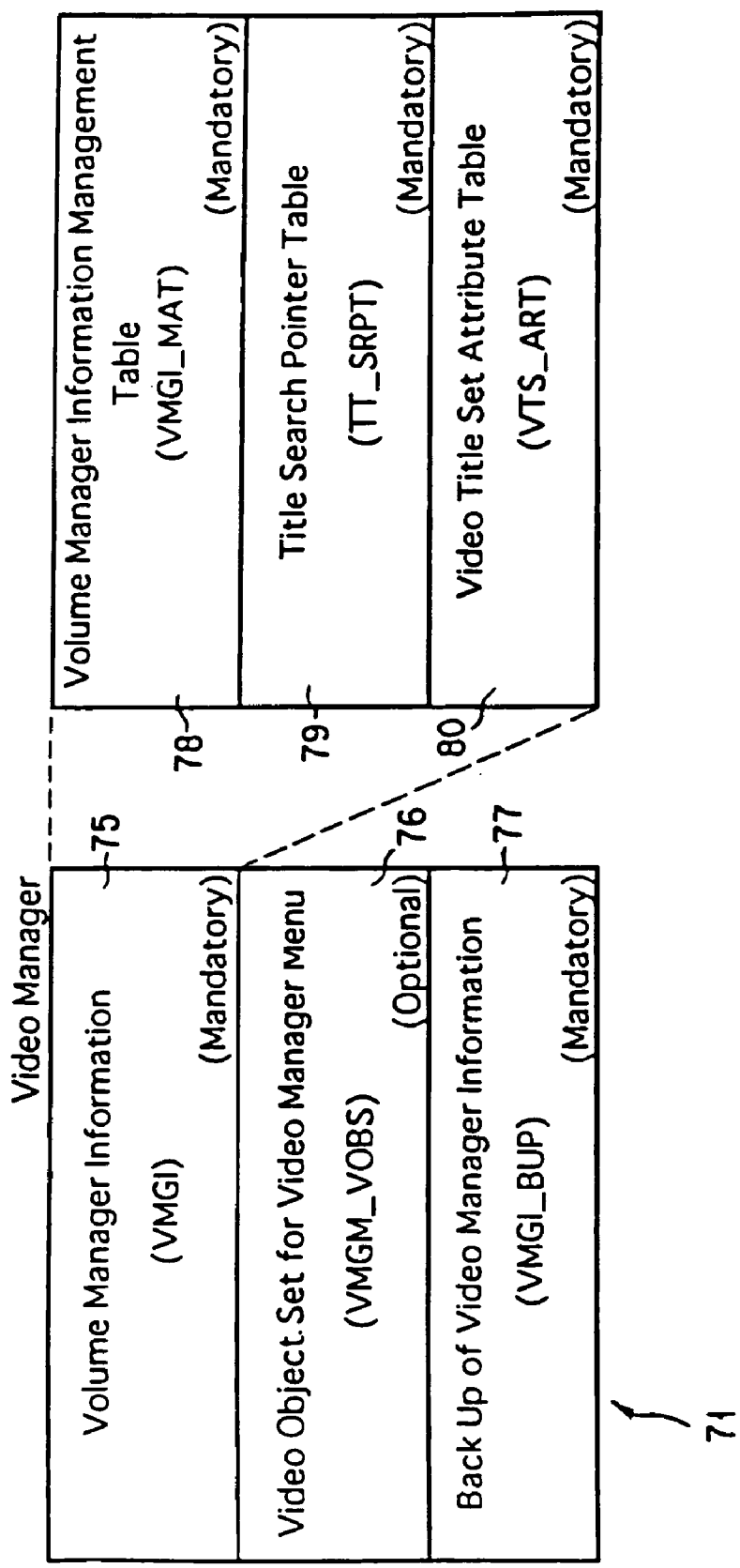
FIG. 5 shows the structure of the video manager of FIG. 4.

As shown in FIG. 5, the video manager 71 contains at least three items each corresponding to individual files 74. Specifically, the video manager 71 is made up of video manager information (VMGI) 75, a video object set for video manager menu (VMGM_VOBS) 76, and backup of video manager information (VMGI_BUP) 77. Here, the video manager information (VMGI) 75 and the backup of video manager information (VMGI_BUP) 77 are indispensable items, and the video object set for video manager menu 76 is an optional item. In the video object set 76 for the VMGM, the video data, audio data, and sup-picture data about a menu of the volumes of the optical disk managed by the video manager 71 are stored.

By the video object set 76 for VMGM (VMGM_VOBS), the volume name of the optical disk 10, the sound accompanying the volume name representation and the description of the sub-picture are displayed and at the same time, selectable items are provided in the form of sub-pictures as in video reproduction explained later. For example, the video object set 76 for the VMGM (VMGM_VOBS) indicates that the optical disk 10 contains video data representing the matches a boxer played until he won a world championship. Specifically, a fighting pose of boxer X, together with a volume name, such as the glorious history of boxer X, is reproduced in the form of video data and at the same time, his theme song is reproduced and his chronological table is provided in a sub-picture. Furthermore, the user is asked which language option to select, English or Japanese, for example, in doing the narration of the matches. At the same time, the user is asked whether a caption in another language should be provided in a sub-picture or which language option should be selected for such a caption. Thus, for example, the VMGM video object set 76 (VMGM_VOBS) provides the user with preparations to watch a video of a match of boxer X in English speech with a sub-picture using Japanese captions.

Figure 6:
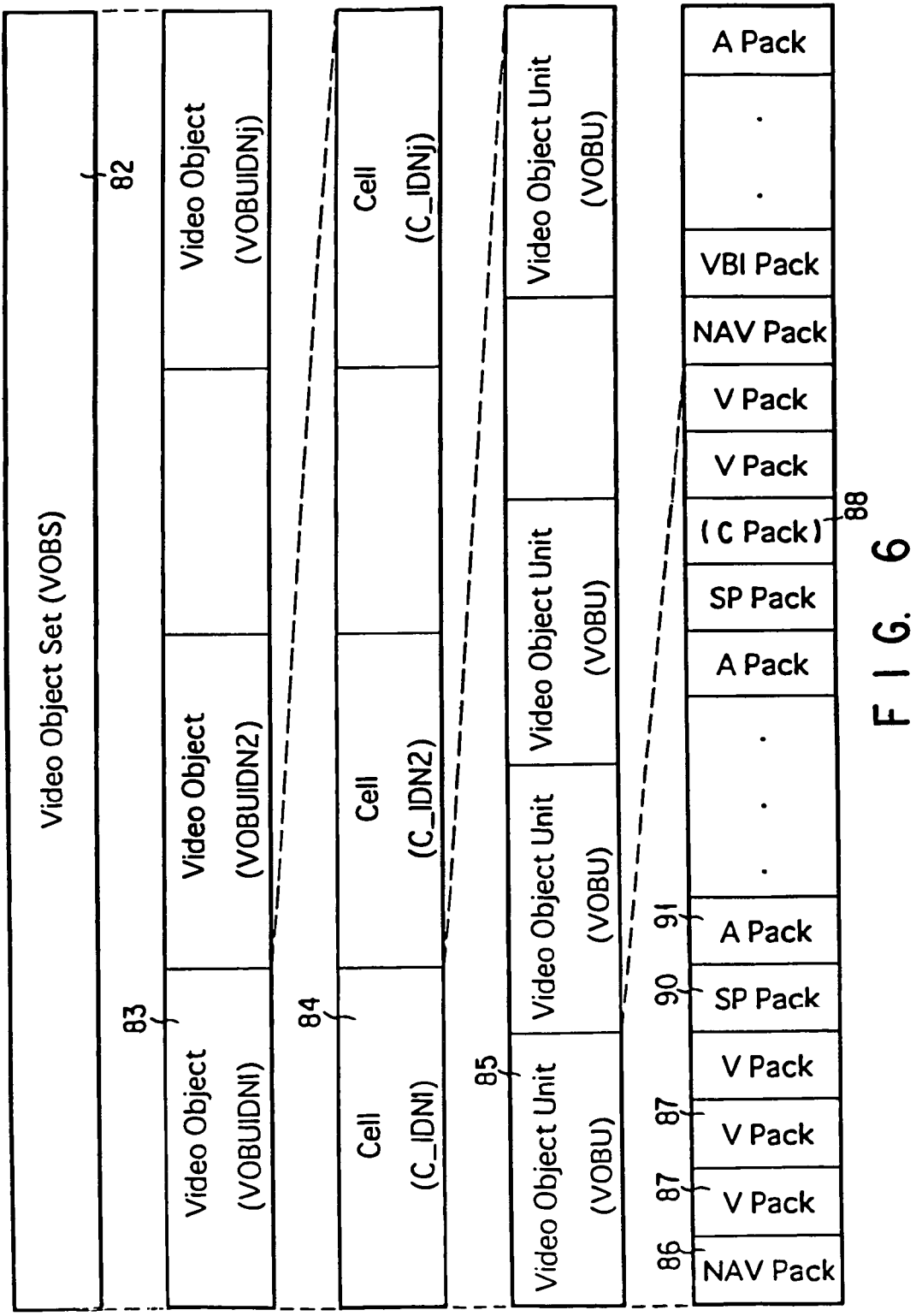
FIG. 6 shows an example of the structure of the video object set (VOBS) shown FIG. 5.

Here, the structure of a video object set (VOBS) 82 will be described with reference to FIG. 6. FIG. 6 shows an example of a video object set (VOBS) 82. The video object set (VOBS) 82 comes in three types for two menus and a title. Specifically, the video object set (VOBS) 82 contains the video title set for video manager menu (VMGM_VOBS) 76, a video object set (VTGM_VOBS) 95 for a menu in the video title sets 72 and a video object set (VTSTT_VOBS) 82 for the titles of at least one video title set 72 in a video title set (VTS) 72 as explained later. Each video object set 82 has the same structure except that their uses differ.

As shown in FIG. 6, a video object set (VOBS) 82 is defined as a set of one or more video object (VOB) 83. The video objects 83 in a video object set (VOBS) 82 are used for the same application. A video object set (VOBS) 82 for menus is usually made up of one video object (VOB) 83 and stores the data used, to display a plurality of menu screens. In contrast, a video object set (VTSTT_VOBS) 82 for title sets is usually composed of a plurality of video objects (VOB) 83.

When the aforesaid video of a boxing match is taken as an example, a video object (VOB) 83 corresponds to the video data of each match played by boxer X. Specifying a particular video object (VOB) 83 enables, for example, boxer X's eleventh match for a world championship to be reproduced on a video. The video object set (VTSM_VOBS) 95 for a menu of the video title sets 72 contains the menu data for the matches played by boxer X. According to the presentation of the menu, a particular match, for example, boxer X's eleventh match for a world championship, can be specified. In the case of a usual single story movie, one video object (VOB) 83 corresponds to one video object set (VOBS) 82. One video stream is completed with one video object set (VOBS) 82. In the case of a collection of animated cartoons or an omnibus movie, a plurality of video streams each corresponding to individual stories are provided in a single video object set (VOBS) 82. Each video stream is stored in the corresponding video object 83. Accordingly, the audio stream and sub-picture stream related to the video stream are also completed with each video object (VOB) 83.

An identification number (IDN#j) is assigned to a video object (VOB) 83. By the identification number (ID#j), the video object (VOB) 83 can be identified. A video object (VOB) 83 further comprises one or more such cells 84. Although a usual video stream is made up of a plurality of cells 84, a menu video stream, or a video object (VOB) 83 maybe composed of one cell 84. A cell 84 is likewise assigned an identification number (C_IDN#j). By the identification number (C_IDN#j), the cell 84 is identified.

As shown in FIG. 6, each cell 84 is composed of one or more video object units (VOBU) 85, normally a plurality of video object units (VOBU) 85. Here, a video object unit (VOBU) 85 is defined as a pack train having a navigation pack (NAV pack) 86 at its head. Specifically, a video object unit (VOBU) 85 is defined as a set of all the packs recorded, starting at a navigation pack (NAV pack) 86 to immediately in front of the next navigation pack. The reproducing time of the video object unit (VOBU) 85 corresponds to there producing time of the video data made up of one or more GOP (Group of Pictures) contained in the video object unit (VOBU) 85 as shown in FIG. 6. The maximum reproducing time is determined to be 0.4 or more second and less than one second. In MPEG, one GOP is defined as compressed image data which corresponds to about 15 frames to be played back for, usually, 0.5 seconds.

In the case where the video data includes a video object unit as illustrated in FIG. 6, GOPs each composed of a video pack (V pack) 87, a sub-picture pack (SP pack) 90, an audio pack (A pack) 91 and a computer data pack (C pack) 88, all complying to the MPEG standards, are arranged, producing a video data stream. Regardless of the number of GOPs, a video object (VOB) 83 is determined based on the time required for producing a GOP. The video object (VOB) 83 has a navigation pack (NAV) pack 86 arranged at its head. Any reproduced data, whether audio data, sub-picture data, or audio/sub-picture data, consists of one more video object units. Thus, even if a video object unit is composed of only audio packs only, these audio packs 91 will be reproduced within the time for reproducing the video object unit. The procedure of reproducing these packs will be explained later in detail, along with the procedure of reproducing the navigation pack (NAV pack) 86.

The video manager 71 will be explained with reference to FIG. 5. The video management information 75 placed at the head of the video manager 71 contains the information used to search for titles and the information used to manage the video title sets (VTS) 72, such as the information used for reproduction of a video manager menu. The video management information 75 contains at least three tables 78, 79, 80 in the order shown in FIG. 5. Each of these tables 78, 79, 80 is aligned with the boundaries between logical sectors. A first table 78, a video manger information management table (VMGI_MAT) 78 is a mandatory table, in which the size of the video manager 71, the starting address of each piece of the information in the video manger 71, and the attribute information about the video object set (VMGM_VOBS) 76 for a video manager menu are written.

Written in a second table of the video manager 71, i.e., a title search pointer table 79 (TT_SRPT), is an entry program chain (EPGC) of the video titles (VTS) 72 contained in the optical disk 10 that are selectable according to the entry of a title number from the key/display section 4 on the apparatus.

Here, a program chain 187 is a set of programs 189 that reproduce the story of a title as shown in FIG. 7. Continuous reproduction of a program chain 87 completes the movie of a title. Therefore, the user can start to see the movie from a particular scene of the movie by specifying the program 89.

In a third table of the video manager 71, i.e., a video title set attribution table (VTS_ATRT) 80, the attribute information associated with the video title set 72 in the volume of the optical disk 10 is written. Specifically, in this table 72, the following items are written as attribute information: the number of video title sets, video title set numbers, video attributes, such as a video data compression scheme, audio stream attributes, such as an audio coding mode, and sub-picture attributes, such as the type of sub-picture display.

The contents of the video manager information management table (VMGI_MAT) 78 and the title search pointer table (TT_SRPT) 79 will be explained in detail with reference to FIGS. 8, 9, 10, and 11.

As shown in FIG. 8, written in the video manager information management table (VMGI_MAT) 78 are a video manager identifier (VMG_ID), the size of video manager information (VMGI_SZ) in logical blocks (one logical block contains 2048 bytes as mentioned above), the version number (VERN) of the optical disk 10 complying with the digital versatile disk video specification, and the category of video manager 71 (VMG_CAT).

In the category of video manager 71 (VMG_CAT), a flag indicating whether or not the DVD video directory prohibits copying is written. Further written in the table (VMGI_MAT) are a volume set identifier (VLMS_ID), the number of video title sets (VTS_Ns), the identifier for a person supplying the data to be recorded on the disk (Provider Unique ID: PVR_ID), a video manager menu video object set start address (VNGM_VOBS_SA), the end address (VMGI_MAT_EA) of a video manager information management table (VMGI-MAT) 78, and the start address (TT_SRPT_SA) of a title search pointer table (TT_SRPT) 79. The end address of VMG_MAT 78 (VMGI_MAT_EA) and the start address of TT_SRPT (TT_SRPT_SA) 79 are represented by the number of logical blocks, relative to the first logical block.

Furthermore, in the table 78, the start address (VTS_ATRT_SA) of the attribute table (VTS_ATRT) 80 of video title sets (VTS) 72 is represented by the number of bytes, relative to the first byte in the VMGI manager table (VMGI_MAT) 71, and the video attribute (VMGM_V_AST) of the video manager menu (VMGM) is written. Further written in the table 78 are the number of audio streams (VMGM_AST_Ns) in the video manager menu (VMGM), the attributes of audio streams (VMGM_AST_ATR) in the video manager menu (VMGM), the number of sub-picture streams (VMGM_SPST_Ns) in the video manager menu (VMGM), and the attributes of sub-picture streams (VMGM_SPST_ATR) in the video manager menu (VMGM).

Figures 9, 10, 11:
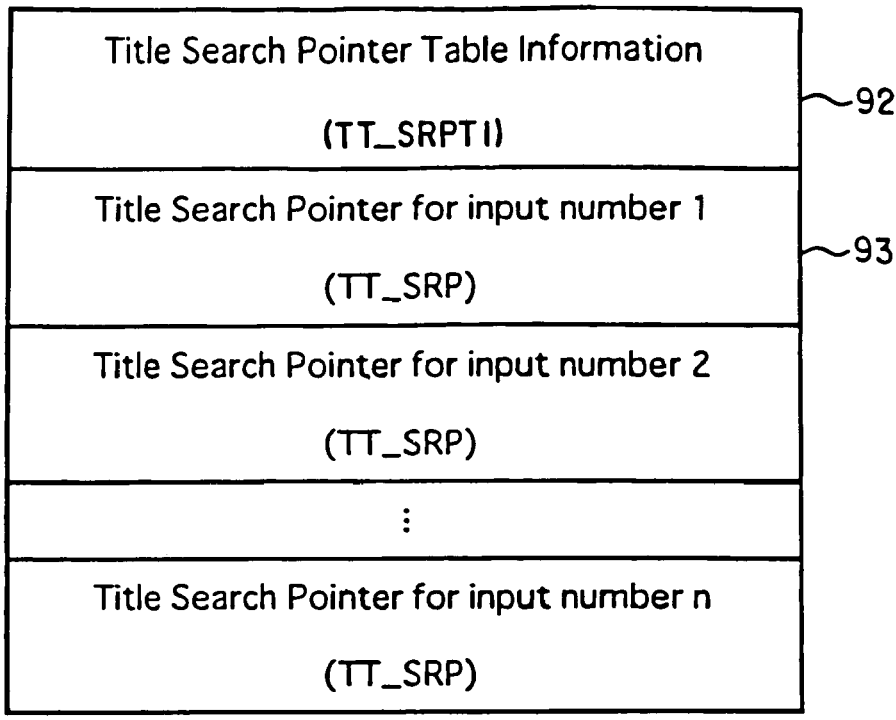
FIG. 9 shows the structure of the title search pointer table (TT_SRPT) in the video manager (VMGI) of FIG. 5.
FIG. 10 shows the parameters and contents of the title search pointer table information (TT-SRPTI) in the title search pointer table (TSPT) of FIG. 9.
FIG. 11 shows the parameters and contents of the title search pointer (TT_SRP) corresponding to the input number in the title search pointer table (TSPT) of FIG. 9.

In the title search pointer table (TT_SRPT) 79, as shown in FIG. 9, the title search pointer table information (TT_SRPTI) 92 is first written and then as many title search pointers for input numbers 1 to n (n≦99) as are needed are written consecutively. When the reproducing data for only one title exists, for example, only the video data for one title is stored in the volume of the optical disk, only one title search pointer (TT_SRP) 93 is written in the table (TT_SRPT) 79.

The title search pointer table information (TT_SRPTI) 92 contains the number of entry program chains (EN_PGC_Ns) and the end address (TT_SRPT_EA) of the title search pointer 93 as shown in FIG. 10. The address (TT_SRPT_EA) is represented by the number of bytes, relative to the first byte in the title search pointer table (TT_SRPT) 79. Furthermore, as shown in FIG. 11, each title search pointer (TT_SRP) 93 contains the video title set number (VTSN), the program chain number (PGCN), and the start address (VTS_SA) of the video title set 72. The contents of the title search pointer (TT_SRP) 93 specifies a video title set 72 to be reproduced and a program chain (PGC) 87 as well as a location in which the video title set 72 is to be stored. The start address (VTS_SA) of the video title set 72 is represented by the number of logical blocks in connection with the title set 72 specified by the video title set number (VTSN).

The structure of the logic format of the video title set 72 shown in FIG. 4 will be described with reference to FIG. 12. In each video title set (VTS) 72, four items are written in the order shown in FIG. 12. Each video title set (VTS) 72 is made up of one or more video titles having common attributes. The video title set information (VTSI) 94 contains the management information on the video titles, including the information on entry search points, the information on playback of video object sets 72, the information on playback of title set menus (VTSM), and the attribute information on video object sets 72.

Each video title set 72 is provided with the backup of the video title set information (VTSI_BUP) 97. Between the video title set information (VTSI) and the backup of the information (VTSI_BUP) 97, a video object set for video title set menus (VTSM_VOBS) 95 and a video object set for video title set titles (VTSTT_VOBS) 96 are arranged. Both of the video object sets (VTSM_VOBS and VTSTT_VOBS) 95, 96 have the structure shown in FIG. 6, as explained earlier.

The video title set information (VTSI) 94, the backup of the information (VTSI_BUP) 97, and the video object set (VTSM_VOBS) 96 for video title set titles are items indispensable to the video title set 72. The video object set (VTSM_VOBS) 96 for video title set menus is an option provided as the need arises.

Figure 12:
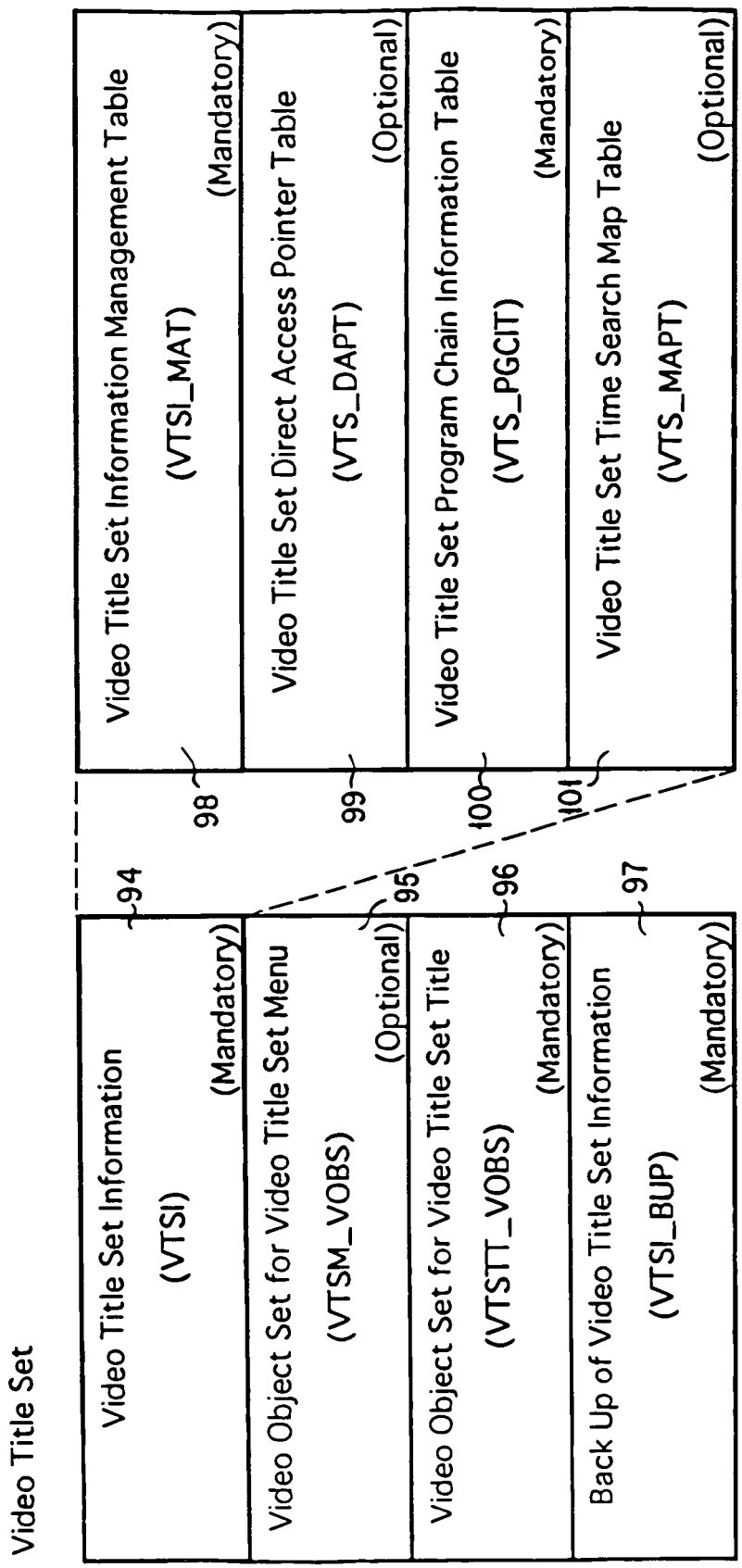
FIG. 12 illustrates the structure of the video title set of FIG. 4.

The video title set information (VTSI) 94 consists of four tables as shown in FIG. 12. The four tables are forced to align with the boundaries between logical sectors. The video title set information management table (VTSI_MAT) 98, a first table, is a mandatory table, in which the size of the video title set (VTS) 72, the start addresses of each piece of information in the video title set (VTS) 72, and the attributes of the video object sets (VOBS) 96 in the video title set (VTS) 72 are written.

The video title set direct access pointer table (VTS_DAPT) 99, a second table, is an optional-table provided as the need arises. Written in the table 99 are the program chains (PGC) 87 and/or programs (PG) 89 contained in the video title set 72 that are selectable according to the entry of a title number from the key/display section 4 of the apparatus.

The video title set program chain information table (VTS_PGCIT) 100, a third table, is a mandatory table, in which the VTS program chain information (VTS_PGCI) 104 is written. The video title set time search map table (VTS_MAPT) 101, a fourth table, is an optional table provided as the need arises, in which the information on the recording location, for a specific period of time of display, of the video data in, each program chain (PGC) 87 in the title set 72 to which the map table (VTS_MAPT) 101 belongs is written.

Next, the video title information management table (VTSI_MAT) 98 and video title, set program chain information table (VTSI_PGCIT) 100 shown in FIG. 12 will be described with reference to FIGS. 13 to 20.

FIG. 13 shows the contents of the video title information management table (VTSI_MAT) 98, in which the video title set identifier (VTS_ID), the size of the video title set 72 (VTS_SZ), the version number of the DVD video specification (VERN), and the video title set category (VTS_CAT) are written in that order. Furthermore, in the table (VTSI_MAT) 98, the start address of the video object set (VTSM_VOBS) for VTS menus is expressed by a logical block relative to the first logical block in the video title set (VTS) 72. The start address (VTSTT_VOB_SA) of the video object 83 for titles in the video title set (VTS) 72 is expressed by a logical block (RLBN) relative to the first logical block in the video title set (VTS) 72.

Furthermore, in the table (VTSI_MAT) 98, the end address (VTI_MAT_EA) of the video title set information management table (VTI_MAT) 98 is represented by the number of blocks, relative to the first byte in the table (VTI_MAT), 98 and the start address of the video title set direct access pointer table (VTS_DAPT) 99 is represented by the number of blocks, relative to the first byte in the video title set information (VTSI) 94.

Still furthermore, in the table (VTSI_MAT) 98, the start address (VTS_PGCIT_SA) of the video title set program chain information table (PGCIT) 100 is expressed by the number of blocks, relative to the first byte of the video title set information (VTSI) 94, and the start address (VTS_MAPT_SA) of the time search map (VTS_DAPT) 101 in the video title set (VTS) 72 is expressed by a logical sector relative to the first logical sector in the video title set (VTS) 72. Written in the table (VTSI_MAT) 98 are the video object set (VTSM_VOBS) 95 for the video title set menu (VTSM) in the video title set (VTS) 72, the video attributes (VTS_V_ATR) of the video object set (VTST_VOBS) 96 for the titles. (VTSTT) in the video title set 72, and the number of audio streams (VTS_AST_Ns) in the video object set (VTSTT_VOBS) 82 for the titles (VTSTT) for the video title sets 72. Here, the video attributes (VTS_V_ATR) include a video compression mode, a frame rate of the TV system, and an aspect ratio for displaying an image on a display unit.

Written in the table (VTSI_MAT) 98 are the audio stream attributes (VTS_AST_ATR) of the video object set (VTST_VOBS) for the titles (VTSTT) in the video title set (VTS). The attributes (VTS_AST_ATR) include, an audio encoding mode indicating how audio is encoded, the number of bits used to quantize audio, and the number of audio channels.

Furthermore, written in the table (VTSI_MAT) 98 are the number (VTS_SPST_Ns) of sub-picture streams in the video object set 82 for the titles (VTSTT) in the video title set (VTS) 72 and the attributes (VTS_SPST_ATR) of each sub-picture stream. The attributes (VTR_SPST_ATR) for each sub-picture stream, include a sub-picture coding mode and a sub-picture display type.

Furthermore, in the table (VTSI_MAT) 98, written are the number (VTSM_AST_Ns) of audio streams in the video title set menu (VTSM), the audiostream4attributes (VTSM_AST_ATR), the number (VTSM_SPST_Ns) of sup-picture streams, and the sub-picture stream attributes (VISM_SPST_ATR).

Figure 14:
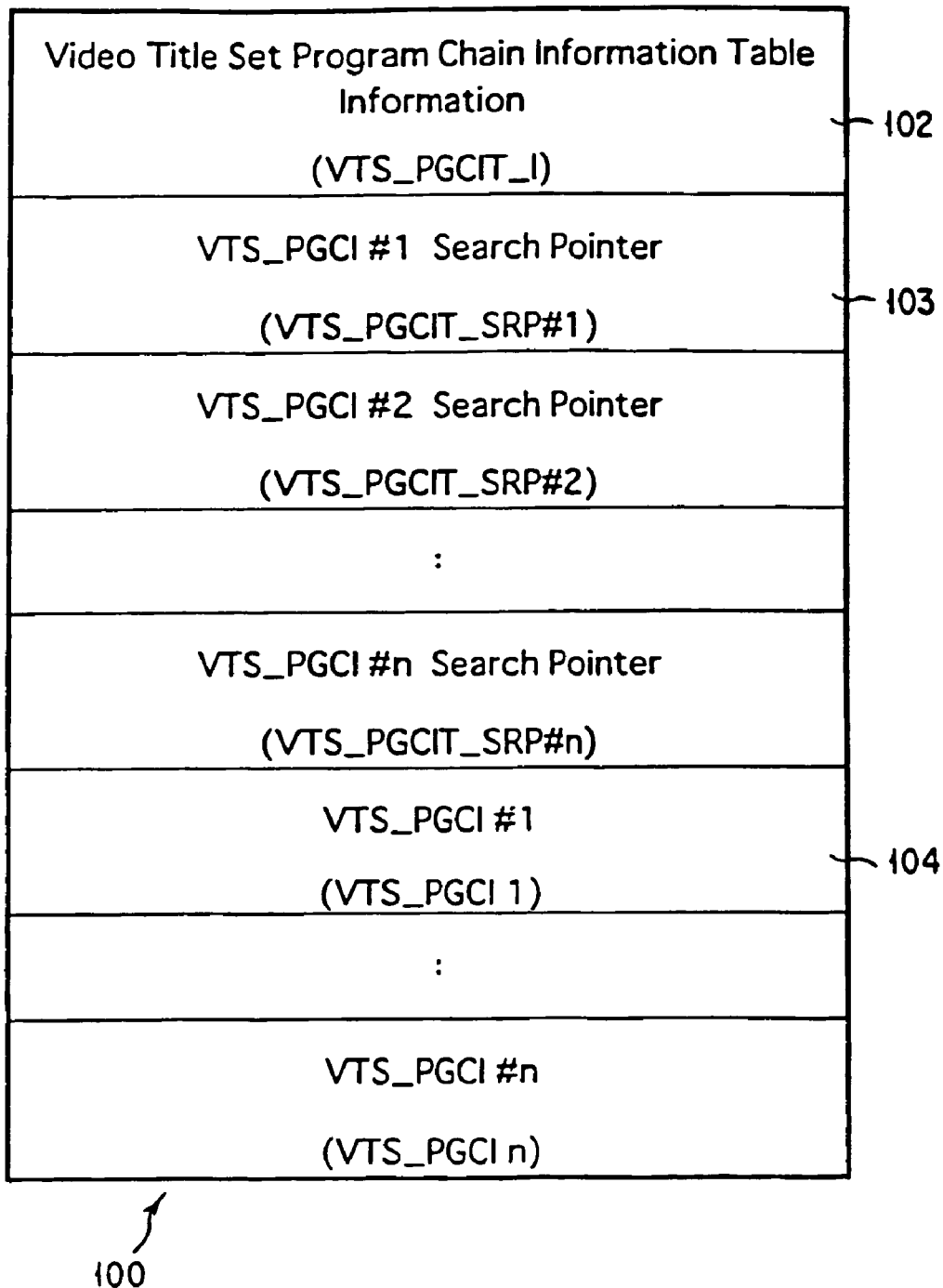
FIG. 14 illustrates the structure of the video title set program chain information table (VTS_PGCT) of the video title set information (VTSI) of FIG. 12.

The VTS program chain information table (VTS_PGCIT) 100 has a structure as shown in FIG. 14. In the information table (VTS_PGCIT) 100, information on the VTS program chain (VTS_PGC) is written, starting with information (VTS_PGCIT_I) 102 on the information table (VTS_PGCIT) 100 related to the VTS program chain (VTS_PGC). In the information table (VTS_PGCIT) 100, the information (VTS_PGCIT_I) 102 is followed by as many VTS_PGCI search pointer (VTS_PGCIT_SRP) 103 used to search for VTS program chains (VTS_PGC) as then number (#1 to #n) of VTS program chains in the information table (VTS_PGCIT). At the end of the table, there are provided as many pieces of information (VTS_PGCI) 104 on the respective VTS program chains (VTS_PGC) as the number (from #1 to #n) of the VTS program chains (VTS_PGC).

The information (VTS_PGCIT_I) 102 in the VTS program chain information table (VTS_PGCIT) 100 contains the number (VTS_PGC_Ns) of VTS program chains (VTS_PGC) as shown in FIG. 15. The end address (VTS_PGCIT_EA) of the table information (VTS_PGCIT_I) 102 is expressed by the number of bytes, relative to the first byte in the information table (VTS_PGCIT) 100.

Furthermore, as shown in FIG. 16, the VTS_PGCIT search pointer (VTS_PGCIT_SRP) 103 contains the attributes (VTS_PGC_CAT) of the program chains (VTS_PGC) in the video title set (VTS) 72 and the start address (VTS_PGCIT_A) of the VTS_PGC information (VTS_PGCI) 104 expressed by the number of bytes, relative to the first byte in the VTS_PGC information table (VTS_PGCIT) 100. Here, the VTS_PGC attribute (VTS_PGC_CAT) is, for example, an attribute indicating whether an entry program chain (Entry PGC) is the first one to be reproduced. Usually, an entry program chain (PGC) is written before program chains (PGC) that are not entry program chains (PGC). Generally, program chains (PGC) are reproduced in the description order of VTS_PGCIs as shown in FIG. 14.

The PGC information (VTS_PGCI) 104, in the video title set 72 contains four items as shown in FIG. 17. In the PGC information (VTS_PGCI) 104, the program, chain general information (PGC_GI) 105 which is a mandatory item is first arranged, followed by at least three items that are only required when there is a video object 83. These three items in the PGC information (VTS_PGCI) 104 area program chain program map (PGC_PGMAP) 106, a cell playback information table (C_PBIT) 107, and a cell position information table (C_POSIT) 108.

As shown in FIG. 18, the program chain general information (PGC_GI) 105 contains the category (PGCI_CAT) of the program chain 187, the contents (PGC_CNT) of the program chain (PGC) 87, and the playback time (PGC_PB_TIME) of the program chain (PGC) 187. Written in the category of PGC (PGCI_CAT) are whether the PGC can be copied or not and whether the programs 89 in the PGC are played back continuously or at random. The contents of PGC (PGC_CNT) contains the description of the program chain structure, that is, the number of programs 89, the number of cells 84, and the number of angles in the program chain 87. The playback time of PGC (PGC_PB_TIME) contains the total playback time of the programs 89 in the PGC. The playback time is the time required to continuously play back the programs 89 in the PGC, regardless of the playback procedure.

Furthermore, the program chain general information (PGC_GI) 105 contains PGC sub-picture stream control (PGC_SPST_CTL) PGC audio stream control (PGC_AST_CTL), and PGC sub-picture pallet (PGC_SP_PLT). The PGC sub-picture stream control (PGC_SPST_CTL) contains the number of sub-pictures usable in the PGC 89 and the PGC audio stream control (PGC_AST_CTL) likewise contains the number of audio streams usable in the PGC 89. The PGC sub-picture palette (PGC_SP_PLT) contains a set of a specific number of color pallets used in all of the sub-picture streams in the PGC 89.

Furthermore, the PGC general information (PGC_GI) 105 contains the start address (C_PBIT_SA) of the cell playback information table (C_PBIT) and the start address (C_POSIT_SA) of the cell position information table (C_POSIT) 108. Both of the start addresses (C_PBIT_SA and C_POSIT_SA) are represented by the number of logical blocks, relative to the first byte in the VTS_PGC information (VTS_PGCI) 105.

The program chain program map (PGC_PGMAP) 108 is a map showing the arrangement of the programs 89 in the PGC 187 of FIG. 19. In the map (PGC_PGMAP) 106, the entry cell numbers (ECELLN), the start cell numbers of the individual programs 89, are written in ascending order as shown in FIGS. 19 and 20. In addition, program numbers are allocated, starting at 1, in the order in which the entry cell numbers are written. Consequently, the first entry number in the map (PGC_PGMAP) 106 must be #1.

The cell playback information table (C_PBIT) defines the order in which the cells 84 in the PGC 187 are played back. In the cell playback information table (C_PBIT) 107, pieces of the cell playback information (C_PBI) are written consecutively as shown in FIG. 21. Basically, cells 84 are played back in the order of cell number. The cell playback information (C_PBIT) 108 contains a cell category (C_CAT) as shown in FIG. 22. Written in the cell category (C_CAT) area cell block mode indicating whether a cell is in the block and if it is in the block, whether the cell is the first one, a cell block type indicating whether a cell 84 is not part of the block or is in an angle block, and an STC discontinuity flag indicating whether the system time clock (STC) must be set again.

Further written in the cell category (C_CAT) area cell playback mode indicating whether the video object units (VOBU) 85 in the cell 84 are played back continuously or a picture is made still at one video object unit (VOBU) 85 to another in the cell 84, and cell navigation control indicating whether the picture is made still after the playback of the cell or indicating the rest time.

As shown in FIG. 22, the cell playback information table (C_PBIT) 107 contains the cell playback time (C_PBTM) representing the total playback time of the PGC 187. When the PGC 187 has an angle cell block, the playback time of the angle cell number represents the playback time of the angle block. Further written in the cell playback information table (C_PBIT) 107 are the start address (C_FVOBU_SA) of the first video object unit (VOBS) 85 in the cell 84 expressed by the number of logical sectors, relative to the first logical sector in the video object unit (VOBS) 85 in which the cell 84 is written and the start address (C_LVOBU_SA) of the end video object unit (VOBS) 85 in the cell 84 expressed by the number of logical sectors, relative to the first logical sector in the video object unit (VOBS) 85 in which the cell 84 is written.

The cell position information table (C_POSI) 108 specifies the identification number (C_VOB_IDN) of the video object (VOB) 85 in the cell used in the PGC 187 and the identification number (IDN) of the cell 84. In the cell position information table (C_POSI) 108, pieces of the cell position information (C_POSI) corresponding to the cell numbers written in the cell playback information table 107 as shown in FIG. 23 are written in the same order as in the cell playback information table (C_PBIT) 107. The cell position information (C_POSI) contains the identification number (C_VOB_IDN) of the video object unit (VOBS) 85 in the cell 84 and the cell identification number (C_IDN) as shown in FIG. 24.

Figures 25, 26:
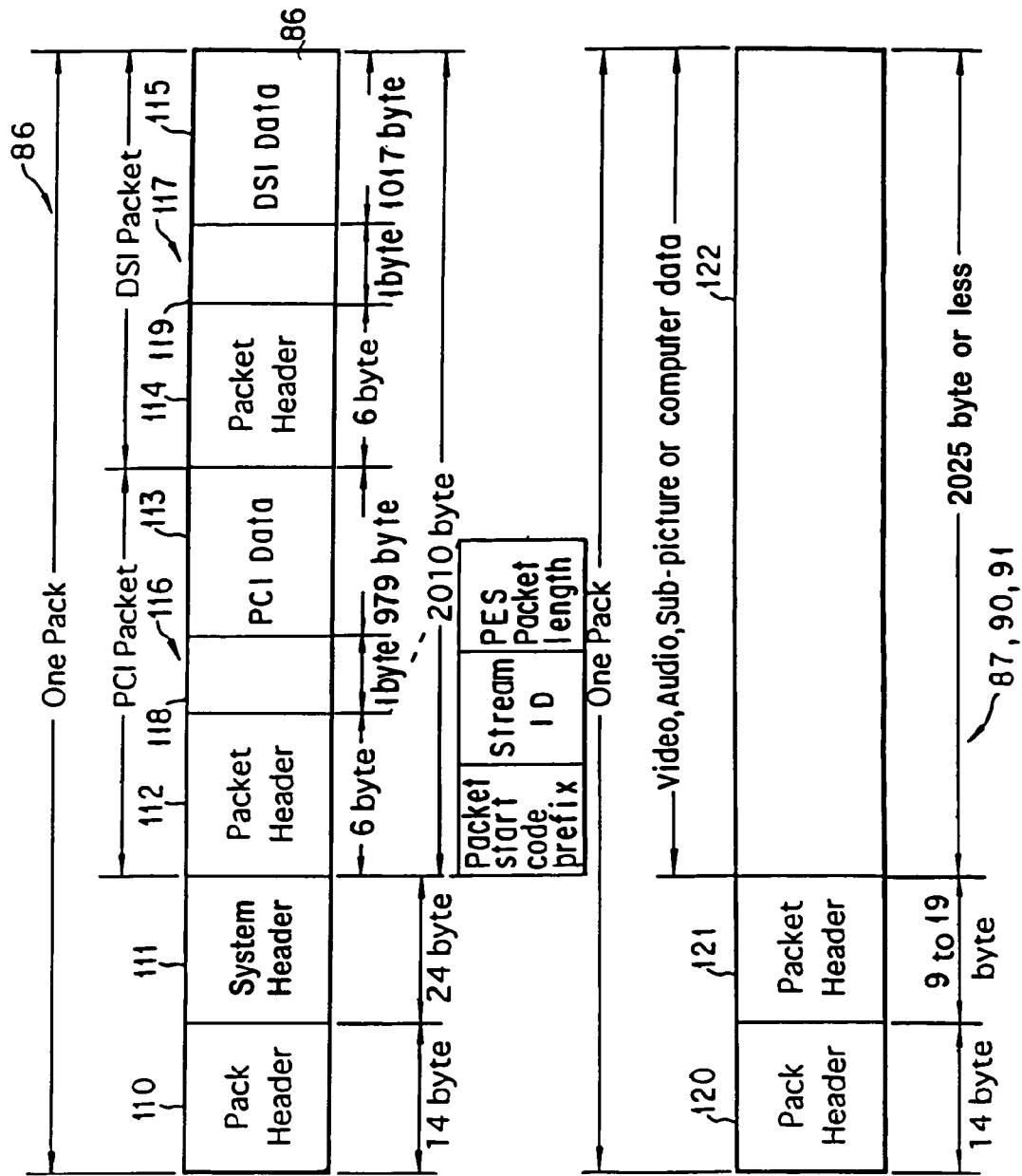
FIG. 25 illustrates the structure of the navigation pack of FIG. 6.
FIG. 26 illustrates the structure of the video, audio, sub-picture, or VBI pack of FIG. 6.

As explained with reference to FIG. 6, a cell 84 is a set of video object units (VOBU) 85. A video object unit 85 is defined as a pack train starting with a navigation (NAV) pack 86. Therefore, the start address (C_FVOBU_SA) of the first video object unit (VOBU) 85 in a cell 84 is the start address of the NAV pack 86. As shown in FIG. 25, the NAV pack 86 consists of a pack header 110, a system header 111, and two packets 116, 117 of navigation data; namely, playback control information (PCI) packet 116 and a data search, information (DSI) packet 117. As many bytes as shown in FIG. 25 are allocated to the respective sections so that one pack may contain 2048 bytes corresponding to one logical sector. The NAV pack is provided immediately before the video pack 88 which contains the first data item in the group of pictures (GOP). Even if the object unit 85 contains no video pack 88, the NAV pack 86 is positioned at the head of the object unit 85, provided that the object unit 85 contains an audio pack 91 and/or a sub-picture pack 90. Thus, even if object unit 85 contains no video pack, its playback time is determined on the basis of the time required for playing back a video pack 88, exactly in the same way as in the case where the unit 85 contains a video pack 88.

Here, a GOP is defined as a data train constituting a screen determined in the MPEG-standards. In other words, a GOP is equivalent to compressed data which maybe expanded into image data representing a plurality of frames of a moving picture. The pack header 110 contains a pack starting code, a system clock reference (SCR), and a multiplex rate. The system header 111 contains a bit rate and a stream ID. The packet header 112, 114 of each of the PCI packet 116 and DCI packet 117 contains a packet starting code, a packet length, and a stream ID as determined in the MPEG2.

As shown in FIG. 26, another video pack 87, audio 15 pack 91 sub-picture pack 90 or computer data pack 88 consists of a pack header 120, packet header 121, and a packet 122 containing the corresponding data as in the system layer 24 MPEG 2. Its pack length is determined to be 2048 bytes. Each of these packs is aligned with the boundaries between logical blocks.

The PCI data (PCI) 113 in the PCI packet 116 is navigation data used to make a presentation, or to change the contents of the display, in synchronization with the playback of the video data in the VOB unit (VOBU) 85. Specifically, the PCI data (PCI) 113 contains PCI general information (PCI_GI) as information on the entire PCI data 113 change as shown in FIG. 27. The PCI general information (PCI_GI) contains the address (NV_PCK_LBN) of the NAV pack 86 in which the PCI data is recorded as shown in FIG. 28, the address being expressed in the number of blocks, relative to the VOBU logical sector in which the PCI data is recorded. The PCI general information (PCI_GI) contains the category of VOBU (VOBU_CAT), the start PTS of VOBU 85 (VOBU_SPTS), and the end PTS of VOBU 85 (VOBU_EPTS). Here, the start PTS of VOBU 85 (VOBU_SPTS) indicates the playback start time (start presentation time stamp (SPTS)) of the video data in the VOBU 85 containing the PCI data. The playback start time is the playback start time of the first picture in the first GOP in the VOBU 85. Normally, the first picture corresponds to I picture (intra-picture) data in the MPEG standards. The end PTS (VOBU_EPTS) in the VOBU 85 indicates the playback end time (end presentation time stamp (EPTS)) of the video data in the VOBU 85 containing the PCI data. The playback end time is the playback start time of the last picture in the last GOP in the VOBU 85.

The DSI data (DSI) 115 in the DSI packet 117 shown in FIG. 25 is the navigation data used to search for a VOB unit (VOBU) 85. The DSI data (DSI) 115 contains the DSI general information (DSI_GI), VOBU search information (VOBU_SI), and the synchronizing playback information (SYNCI) as shown in FIG. 29.

The DSI information (DSI_GI) contains information about the entire DSI data 115. Specifically, as shown in FIG. 30, the DSI general information (DSI_GI) contains the system clock reference for the NAV pack (NV_PCK_SCR) 86. The system clock reference is stored in the system time clock (STC) 54A, 58A, 60A or 62A built in each section of FIG. 1. On the basis, of the STC 54A, 58A, 60A, 62A, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NAV pack 86 containing the DSI data expressed by the number of logical sectors (RLSN), relative to the first logical sector in the VOB set (VOBS) 82 containing the DSI, and the address (VOBU_EA) of the last pack in the VOB unit (VOBU) 85 containing the DSI data expressed by the number of logical sectors (RLSN), relative to the first logical sector in the, VOB unit (VOBU) 85.

Furthermore, the DSI general information (DSI_GI) contains the end address (VOBU_IP_EA) of the video pack 88 containing the last data item for the first I picture in the VOB unit (VOBU) expressed by the number of logical sectors (RLSN), relative to the first logical sector in the VOB unit (VOBU) 85 containing the DSI data, and the identification number (VOBU_IP_EA) of the VOB 83 containing the DSI and the identification number (VOBU_C_IDN) of the cell 84 in which the DSI data is recorded.

The search information (VOBU_SI) in VOBU 85 contains information used to identify the first address in a cell 84.

The synchronizing information (SYNCI) contains address information on the sub-pictures and audio data reproduced in synchronization with the playback start time of the video data in the VOB unit (VOBU) 85 containing the DSI data. Specifically, as shown in FIG. 31, the start address (A_SYNCA) of the target, audio pack is expressed by the number of logical sectors (RLSN), relative to the NAV pack 86 in which DSI data 115 is recorded. When there are more than one audio stream (8 audio streams maximum), as many pieces of the synchronizing information (SYNCI) as there are audio streams are written. Furthermore, the synchronizing information (SYNCI) contains the address (SP_SYNCA) of the NAV pack 86 of the VOB unit (VOBU) 85 containing the target audio pack 91, the address being expressed by the number of logical sectors (RLSN), relative to the NAV pack 86 in which DSI 115 is recorded. When there are more than one sub-picture stream (32 sub-picture streams maximum), as many pieces of the synchronizing information (SYNCI) as there are sub-picture streams are written.

The pack length of the above pack is adjusted to 2048 bytes (one logical sector). If the pack length is less than 2048 bytes and when the number of bytes necessary for attaining the above value is six bytes or less, the pack length is adjusted by adding stuffing bytes in the pack header, and when the necessary number of bytes is seven bytes or more, the packet length is adjusted by adding one byte of stuffing byte and adding a padding packet corresponding to the necessary number of bytes to the packet.

The pack header is constructed by a 4-byte pack start code (000001BAh), 6-byte SCR (System Clock Reference, system time standard reference value), 3-byte multiplexing rate (MUX rate; 0468A8h), and 1-byte to 7-byte stuffing bytes (00h). The packet is constructed by 2034 bytes as a reference and a padding packet (effective data ooh which has no significance as data is recorded in the unit of byte) for pack length adjustment is inserted into the packet as required.

Figure 32:
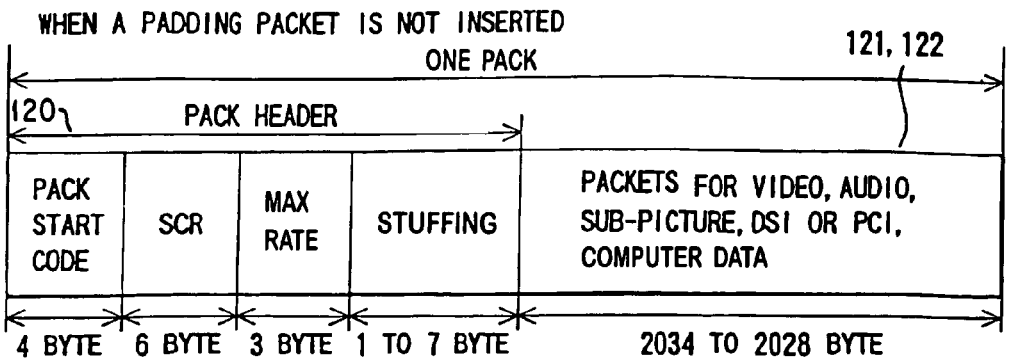
FIGS. 32, 33 are diagrams for illustrating the structure of a pack.

That is, as shown in FIG. 32, in a case where the length of data constructing the packet is 2034 bytes to 2028 bytes, one or more stuffing bytes corresponding to a deficient number of byte or bytes are added to (inserted into) the pack header.

Figure 33:
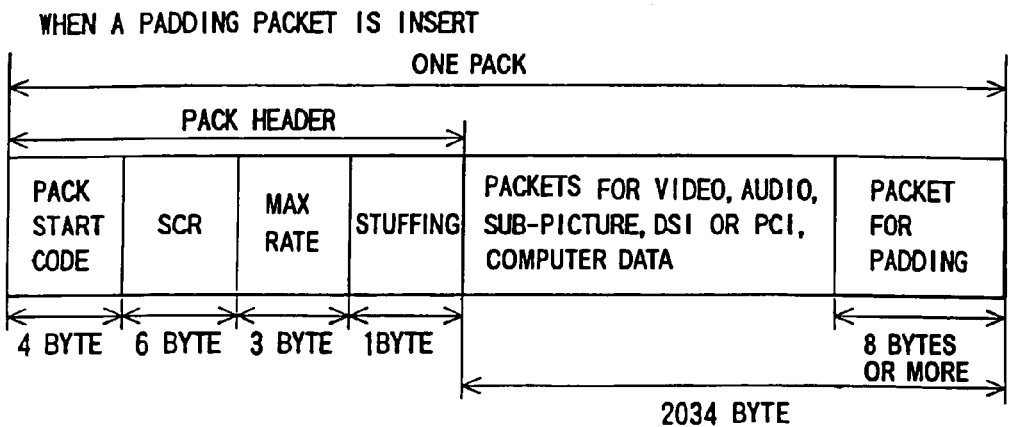

Further, as shown in FIG. 33, in a case where the length of data constructing the packet is 2027 bytes or less, a padding packet of bytes of a number corresponding to the deficient number is added.

For example, a case wherein video data is formed in a pack form is explained.

That is, as shown in FIG. 34, in a case where video data having a data length of 2015 bytes is formed in a pack form, the reference byte number (2034 bytes) of one packet is compared with a byte number (2021 bytes) obtained by adding six bytes of the packet header to the number of bytes (2015 bytes) of the video data, and as the result of comparison, it is determined that a deficient number of bytes is 13 and it is necessary to add a padding packet of 13 bytes, and a pack of 2048 bytes is formed by a normal 14-byte pack header including a 1-byte stuffing byte and a packet of 2034 bytes constructed by adding a 13-byte padding packet to the video packet of 2021 bytes.

Further, as shown in FIG. 35, in a case where video data having a data length of 2025 bytes is formed in a pack form, the reference byte number (2034 bytes) of one packet is compared with a byte number (2031 bytes) obtained by adding six bytes of the packet header to the number of bytes (2025 bytes) of the video data, and as the result of comparison, it is determined that a deficient number of bytes is 3 and it is necessary to add 3-byte stuffing bytes, and a pack of 2048 bytes is formed by a 17-byte pack header including 3-byte stuffing bytes in addition to a 1-byte stuffing byte and a video packet of 2031 bytes.

Next, the above pack is explained in detail.

As shown in FIG. 25, an NAV pack 86 is arranged just before a video pack containing head data of one GOP and constructed by a 14-byte pack header 110, 24-byte system header 111, PCI packet 116 of 980, bytes or less, and DSI packet 117 of 1024 bytes or less. The PCI packet 116 is constructed by a 6-byte packet header 112, 1-byte sub-stream ID 118, and a data area 113 in which 979-byte PCI data can be stored, and the DSI packet 117 is constructed by a 6-byte packet header 114, 1-byte sub-stream ID 119 and a data area 115 in which 1017-byte DSI data can be stored.

As described before, the pack header 110 is constructed by a 4-byte pack start code (000001Bah) 6-byte SCR (System Clock Reference, system time standard reference value), 3-byte multiplexing rate (MUX rate; 0468A8h), and 1-byte to 7-byte stuffing bytes (00h).

The system header 111 is constructed by a 4-byte system header start code (000001BBh), 2-byte header length and the like.

The packet headers 112, 114 are each constructed by a 3-byte packet start code (000001h), 1-byte stream ID (10111111b: private stream 2), 2-byte PES (Packetized Elementary Stream) packet length.

A code (00000000b) indicating the PCI stream is given to the sub-stream ID 118.

A code (00000001b) indicating the DSI stream is given to the sub-stream ID 119.

Figure 36A:
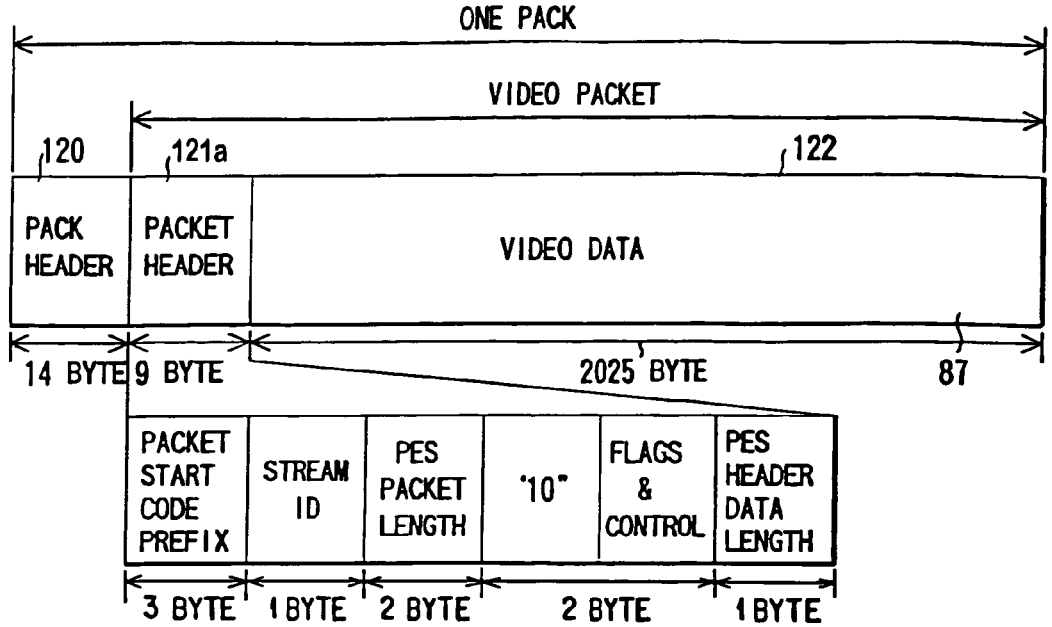
FIGS. 36A, 36B are diagrams for illustrating the structure of a video pack.
Figure 36B:
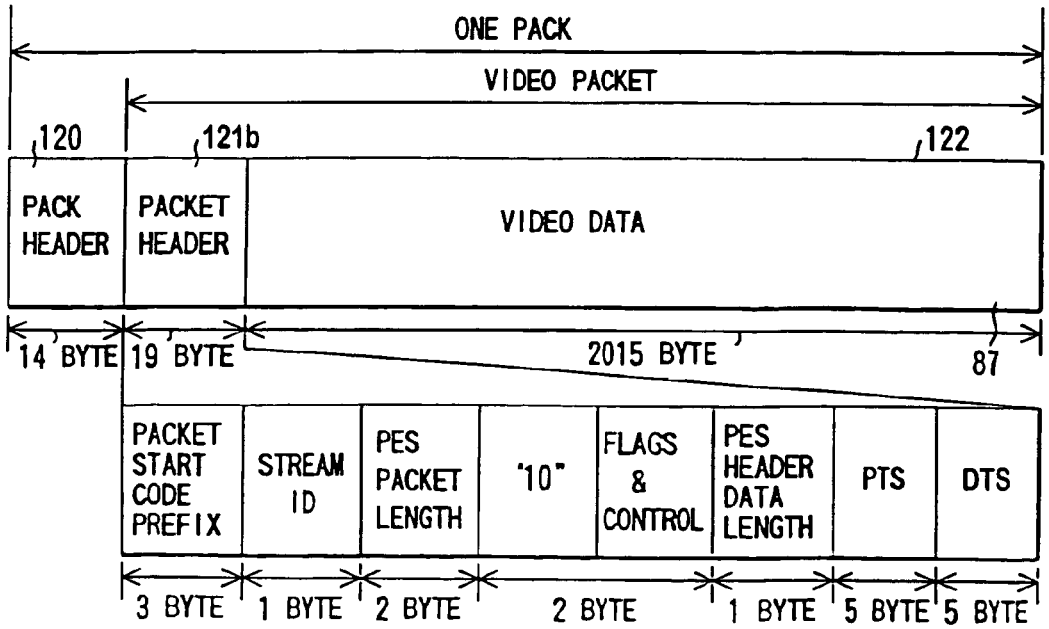

As shown in FIGS. 36A, 36B, in a video pack 87, one pack is constructed by a 14-byte pack header 120 and a video packet which is constructed by a 9-byte packet header 121a and a data area 122 in which video data of up to 2025 bytes can be stored (FIG. 36A) or a video packet constructed by a 19-byte packet header 121b and a data area 122 in which video data of up to 2015 bytes can be stored (FIG. 36B). The pack header 120 has the same structure as that used in the case of the NAV pack 86.

If the packet header 121b is a 9-byte packet header, it is constructed by a 3-byte packet start code (0000001h), 1-byte stream ID (11100000b: MPEG video stream), 2-byte PES (Packetized Elementary Stream) packet length, and 3-byte data relating to PES.

If the packet header 121 is a 19-byte packet header, it contains a 5-byte PTS (Presentation Time Stamp; time management information for reproduction output) and a 5-byte DTS (Decoding Time Stamp; time management information for decoding) in addition to the above 9 bytes. The PTS and DTS are described only in a video packet containing head data of I picture of the video stream.

Figure 37A:
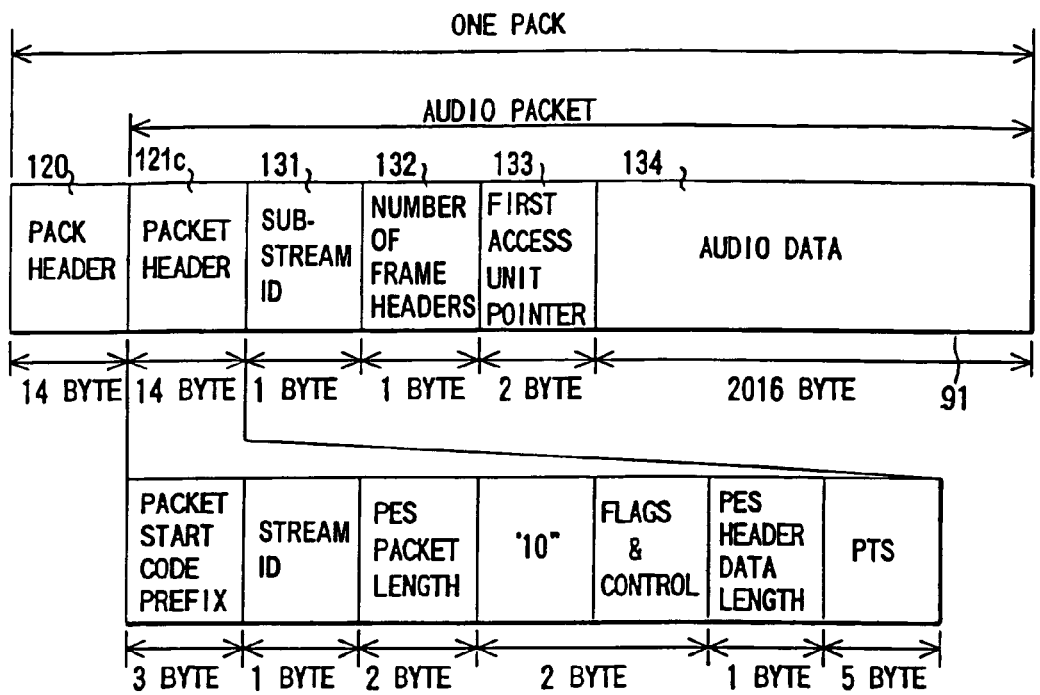
FIGS. 37A, 37B are diagrams for illustrating the structure of an audio pack.

If an audio pack 91 is compressed coding data which conforms to the Dolby AC3, as shown in FIG. 37A, one pack is constructed by a 14-byte pack header 120 and an audio packet which is constructed by a 14-byte packet header 121c, 1-byte sub-stream ID 131, a frame number 132 of one-byte configuration indicating the number of audio frames in the-packet data, a first access unit pointer 133 of two-byte configuration indicating the head position of the first audio frame in the packet data, and a data area 134 in which audio data of up to 2016 bytes can be stored. The pack header 120 has the same structure as that used in the case of the NAV pack 86. If no PTS is contained in the packet header 121c, the packet header 121c is constructed by 9 bytes and the capacity of the data area 134 in which audio data can be stored is expanded to 2021 bytes.

Figure 37B:
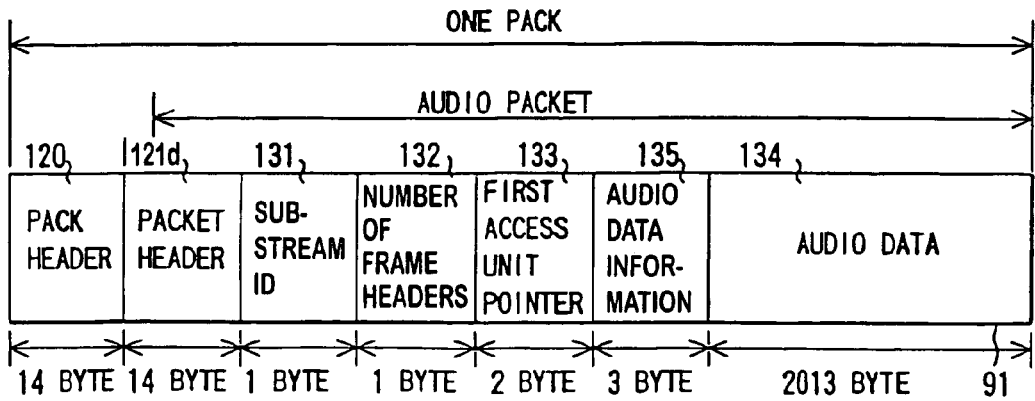

If the audio pack 91 is linear PCM coding data, as shown in FIG. 37B, one pack is constructed by a 14-byte pack header 120 and an audio packet which is constructed by a 14-byte packet header 121d, 1-byte sub-stream ID 131, a frame number 132 of one-byte configuration indicating the number of audio frames in the packet data, a first access unit pointer 133 of two-byte configuration indicating the head position of the audio frame in the packet data, audio data information 135 of three-byte configuration in which information of audio data in the packet data is described, and a data area 134 in which audio data of up to 2013 bytes can be stored. The pack header 120 has, the same structure as that used in the case of the NAV pack 86. If no PTS is contained in the packet header 121d, the packet header 121d is constructed by 9 bytes and the capacity of the data area 134 in which audio data can be stored is expanded to 2018 bytes.

As information of audio data of the audio data information, a frame number, a processing unit indicating that one data length is 16-bit length, 20-bit length or 24-bit length, a sampling frequency, and the like are described.

The packet header 121 is constructed by a 3-byte packet start code (000001h), 1-byte streamed (10111101b: private stream 1), 2-byte PES (Packetized Elementary Stream) packet length, 3-byte content of PES, and 5-byte PTS (Presentation Time Stamp; time management information for reproduction output).

In the sub-stream ID 131 given in a case where audio data is compressed coding data which conforms to the Dolby AC3, a code (10000xxxb:xxx is a stream number) indicating an AC3 stream is provided.

In the sub-stream ID 131 given in a case where audio data is linear PCM, a code (10100xxxb:xxx is a stream number) indicating a linear PCM stream is provided.

One frame of the audio data is constructed by, for example, 772-byte audio data containing a 4-byte frame header and four bytes on the right and left sides of "0" to "191".

Figure 38:
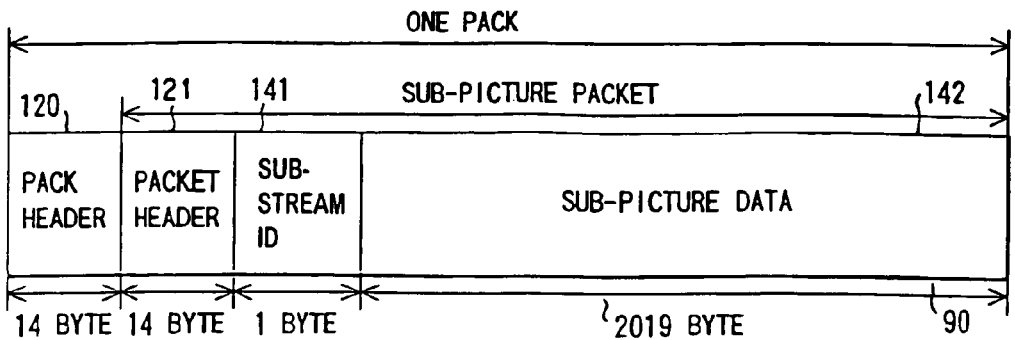
FIG. 38 is a diagram for illustrating the structure of a sub-picture pack.

As shown in FIG. 38, in a sub-picture pack 90, one pack is constructed by a 14-byte pack header 120 and a sub-picture packet which is constructed by a 14-byte packet header 121, 1-byte sub-stream ID 141 and a data area 142 in which sub-picture data of up to 2019 bytes can be stored. If no PTS is contained in the packet header 121, the packet header 121 is constructed by 9 bytes and the capacity of the data area 142 in which sub-picture data can be stored is expanded to 2024 bytes. The pack header 120 has the same structure as that used in the case of the NAV pack 86.

A code (001xxxxxb:xxxxx stream number) indicating a sub-picture stream is given to the sub-stream ID 141.

The packet header 121 is constructed by 3-byte packet start code (000001h), 1-byte stream ID (10111101b: private stream 1), 2-byte PES (Packetized Elementary Stream) packet length, 3-byte data relating to PES, and 5-byte PTS (Presentation Time Stamp; time management information for reproduction output). The PTS is described only in a sub-picture packet containing head data of each sub-picture unit.

As shown in FIG. 39, in a computer data pack 88, one pack is constructed by a 14-byte pack header 120 and a packet which is constructed by a 14-byte packet header 121, 1-byte sub-stream ID 151, 2-byte computer environmental data 152 and a data area 153, in which computer data of up to 2017 bytes can be stored. If no PTS is contained in the packet header 121, the packet header 121 is constructed by 9 bytes and the capacity of the data area 153 in which computer data can be stored is expanded to 2022 bytes. The pack header 120 has the same structure as that used in the case of the NV pack 86.

As the computer environmental data 152, an application CPU and application OS are described. For example, as shown in FIG. 40, four different classifications can be selected, and if the application CPU is "CPU1" and the application OSIs "OS1", 0110(h) is described, if the application is "CPU1" and the 2025 application OS is "OS2", "0111(h)" is described, if the application CPU is "CPU2" and the application OS is "OS3", "1002(h)" is described, and if the application CPU is "CPUs" and the application OS is "OS3", "0102 (h)" is described.

A code (11000000b) indicating a computer stream is given to the sub-stream ID.

The packet header 121 is constructed by a 3-byte packet start code (000001h), 1-byte stream ID (10111101b: private stream 1), 2-byte PES (Packetized Elementary Stream) packet length, 3-byte data relating to PES, and 5-byte PTS (Presentation Time Stamp; time management information for reproduction output). PTS is described only in a computer data packet. The containing head data of each computer data stream.

In an SCR described in each of the above packs, the value of ahead pack for each video title set is set to "0" and increased in an ascending order according to the order of recording of data into the optical disk 10.

As shown in FIG. 41, the stream ID described in the packet header 121 of each pack indicates the program stream map in the case of "10111100", the private stream 1 in the case of "10111101", the padding stream (dummy data) in the case of "10111110", the private stream 2 in the case of "10111111", the MPEG audio stream (xxxxx; stream number) in the case of "110xxxxx", the MPEG video stream (xxxx; stream number) in the case of "1110xxxx", the entitlement (permission) control message in the case of "11110000", the entitlement (permission) management message in the case of "111110010", the DSM control command in the case of "11110010", and the program stream directory in the case of "11111111".

The sub-stream IDs 131, 141, 151 respectively described in the packs of the audio pack 91, sub-picture pack 90, computer data pack 88 correspond to the private stream 1, and as shown in FIG. 42, the stream ID indicates the linear PCM audio stream in the case of "10100xxx" in which "xxx" indicates the stream number, indicates the sub-picture stream in the case of "OOlxxxxx" in which "xxxxx" indicates the stream number, indicates the computer data stream in the case of "11000000", and indicates the Dolby AC3 audio stream in the case of "10000xxx" in which "xxx" indicates the stream number.

The sub-stream IDs 118, 119 respectively described in the PCI packet and DSI packet in the NV pack 87 correspond to the private stream 2, and as shown in FIG. 43, the sub-stream ID indicates the PCI stream in the case of "00000000", and indicates the DSI stream in the case of "00000001".

Next, a concrete example of the structure of the pack 91 of linear audio data is explained with reference to FIG. 44.

As the stream ID in the packet header 121, "10111101" indicating the private stream 1 is described, as the sub-stream ID 131 in the packet header 121, "10100011" indicating the linear PCM audio stream is described and "3" is described as the stream number thereof, and as the first access unit pointer 133, "OlDB(h)" is described. In the data area 134 of the packet, remaining data (472 bytes) in the preceding frame and two frame data items (772-byte configuration for one frame) are stored.

Next, a concrete example of the structure of the pack 88 of computer data is explained with reference to FIG. 45.

As the stream ID in the packet header 121, "1011101" indicating the private stream 1 is described, as the sub-stream ID 151, "110000000" indicating the computer data stream is described, and as the computer environmental data 152, "0111(h)" indicating that the application CPU is "CPU1" and the application OS is "OS2" is described. In the data area 153 of the packet, computer data is stored.

Next, a concrete example of the structure of the pack 90 of sub-picture data is explained with reference to FIG. 46.

As the stream ID in the packet header 121, "10111101" indicating the private stream 1 is described, as the sub-stream ID 141, "00100101" indicating the sub-picture stream is described and "5" is described as the stream number thereof. In the data area 142 of the packet, sub-picture data of up to 2019 bytes is stored.

Figure 47:
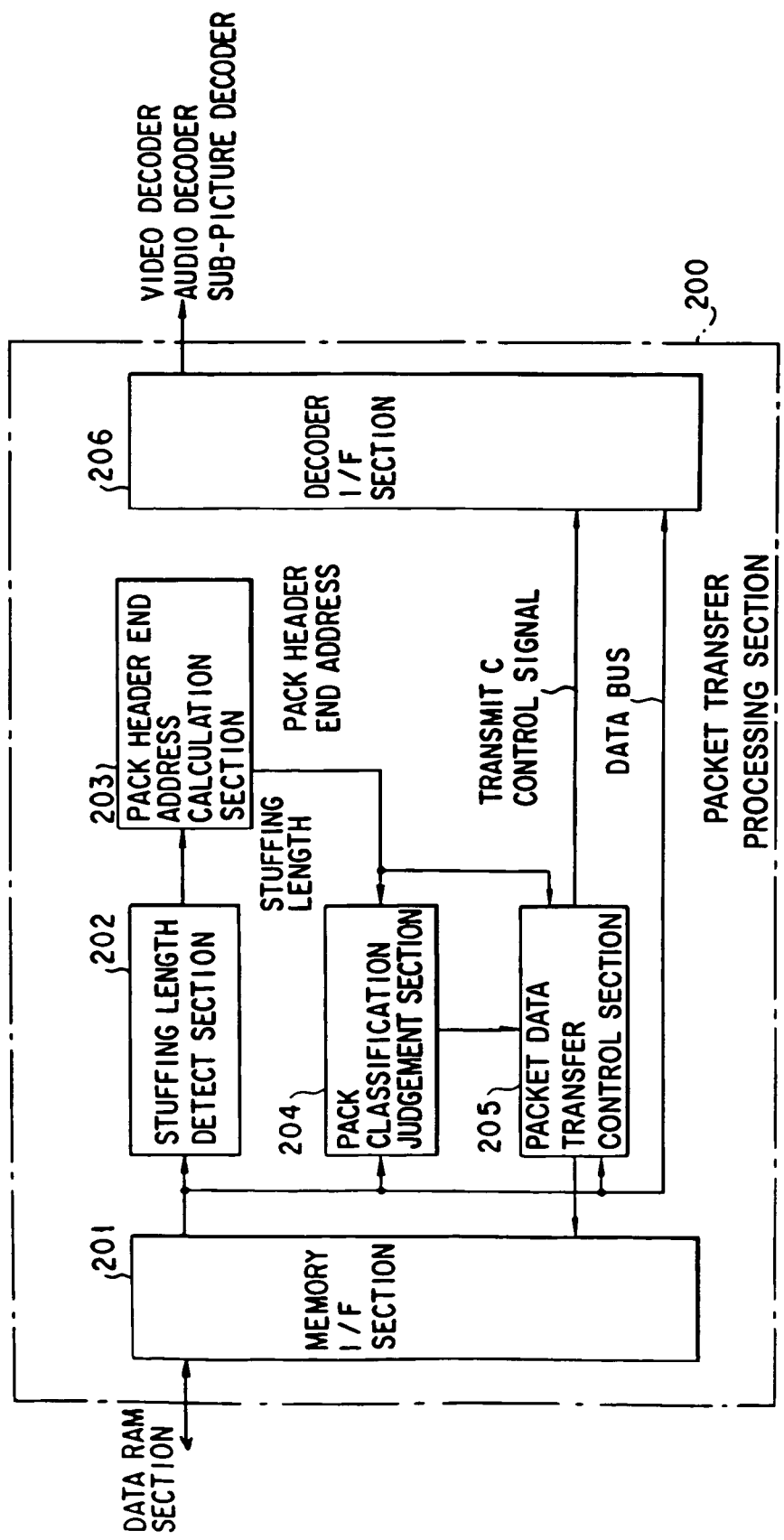
FIG. 47 is a block diagram for illustrating the construction of a packet transfer processing section.

The system processor section 54 includes a packet transfer processing section 200 for determining the classification of the packet and transferring data in the packet to each decoder. As shown in FIG. 47, the packet transfer processing section 200 includes a memory interface section (memory I/F section) 201, stuffing length detecting section 202, pack header end address calculating section 203, pack classification judgment section 204, packet data transfer control section 205 and decoder interface section (decoder I/F section) 206.

The memory I/F section 201 outputs pack data from the data RAM section 56 to the stuffing length detecting section 202, pack classification judgment section 204, packet data transfer control section 205 and decoder I/F section 206 via a data bus.

The stuffing length detecting section 202 detects the number of bytes of the stuffing length in the pack header 120 in pack data supplied from the memory I/F section 201 and the result of detection is output to the pack header end address calculating section 203.

The pack header end address calculating section 203 calculates a pack header end address based on the stuffing length supplied from the stuffing length detecting section 202 and the result of calculation is output to the pack classification judgment section 204 and packet data transfer control section 205.

The pack classification judgment section 204 determines one of the video pack 87, audio pack 91, sub-picture pack 90, NV pack 86 and computer data pack 88 based on the content of 4-byte data which comes after an address included in pack data supplied from the memory I/F section 201 according to the pack header end address supplied from the pack header end address calculating section 203 and the result of determination is output to the packet data transfer control section 205.

When a 1-byte stream ID indicating the private stream 2 is supplied, the NV pack 86 is identified. When a stream ID indicating a video stream is supplied, the video pack 87 is identified. When a 1-byte stream ID indicating a private stream 1 is supplied, the audio pack 81, the sub-picture pack 90 or the computer data pack 88 is identified.

When the audio pack 91, sub-picture pack 90 or computer data pack 88 is determined, the Dolby AC3 audio stream, linear audio stream, sub-picture stream or computer data stream is determined according to the sub-stream ID 131, 141, or 151 which follows the packet header 121.

For example, as shown in FIG. 42, the linear audio stream is determined in the case of "10100xxx" (xxx; stream number), the Dolby AC3 audio stream is determined in the case of "10000xxx" (xxx; stream number), the sub-picture stream is determined in the case of "001xxxxx" (xxxxx; stream number), and the computer data stream is determined in the case of "11000000".

The packet data transfer control section 205 determines the transfer destination and packet start address according to the pack header end address supplied from the pack header end address calculating section 203 and the result of judgment of pack classification supplied from the pack classification, judgment section 204 and determines the packet length in the packet header 121 of the supplied pack data. Further, the packet data transfer control section 205 supplies a signal indicating the transfer destination as a transfer control signal to the decoder I/F section 206 and the packet end address based on the packet start address is supplied to the memory I/F section 201.

The decoder I/F section 206 outputs video data, audio data, sub-picture data to corresponding decoder sections 58, 60, 62 as packet data containing the packet header 121 supplied from the memory I/F section 201 to the packet data transfer control section 205 in response to a transfer control signal supplied from the packet data transfer control section 205 and outputs navigation data and computer data as packet data to the data RAM 56.

Next, the operation of reproducing movie data from the optical disk 10 having the logic format shown in FIGS. 4 to 24 is explained with reference to FIG. 1. In FIG. 1, arrows indicated by solid lines between the blocks indicate data buses and arrows indicated by broken lines indicate control buses.

In the optical disk device shown in FIG. 1, when the power supply is turned ON, the system CPU section 50 reads out an initial operation program from the system ROM and RAM 52 and operates the disk drive section 30. Therefore, the disk drive section 30 starts the readout operation for the lead-in area 27 and then the readout operation is effected for the volume and file structure area 70 which follows the lead-in area 27 and defines the volume and file structure in conformity to ISO-9660 or the like. The CPU section 50 supplies a read instruction to the disk drive section 30 to read out data from the volume and file structure area 70 recorded in a preset position of the optical disk 10 set in the disk drive section 30, reads out the content of the volume and file structure area 70 and temporarily stores the read out content into the data RAM section 56 via the system processor section 54. The system CPU section 50 extracts management information as information necessary for the management and information of the recording position, recording capacity, size and the like of each file by use of a pass table and directory record stored in the data RAM section 56, transfers the same to a preset location of the system ROM & RAM 52 and stores the same therein.

Next, the system CPU section 50 acquires the video manager 71 constructed by a plurality of files starting from the file number "0" from the system ROM & RAM section 52 by referring to information of the recording position and recording capacity of each file. That is, the system CPU section 50 supplies a read instruction to the disk drive section 30 by referring to information of the recording position and recording capacity of each file acquired from the system ROM & RAM section 52, acquires the position and size of a plurality of files constructing the video manager 71 lying on the route directory, reads out the video manager 71, and stores the same into the data RAM section 56 via the system processor section 54. The video manager information management table (VMGI_MAT) 78 which is the first table of the video manager 71 is searched. A start address (VMGM_VOBS_SA) of the video object set (VMGM_VOBS) 76 for the video manager menu (VMGM) is acquired by the searching operation and the video object set (VMGM_VOBS) 76 is reproduced. The operation of reproducing the video object set (VMGM_VOB) 76 is the same as the reproducing operation for the video object set (VTSM_VOBS) for the title in the video title set (VTS), and therefore, explanation for the reproducing procedure is omitted. When the language is set by use of the video object set (VTGM_VOBS) 76 or when no video manager menu (VMGM) is present, the video manager information management table (VMGI_MAT) is searched to search for the start address (TT_SRPT_SA) of the title set search pointer table (TT_SRPT) 79.

By the searching operation, the title set search pointer table (TT_SRPT) 79 is transferred to a preset location of the system ROM & RAM section 52 and stored therein. Next, the system CPU section 50 acquires a last address of the title search pointer table (TT_SRPT) 79 from the title search pointer table information (TSPTI) 92 and acquires a start address (VTS_SA) of the video title set, program chain number (PGCN) and video title set number (VTSN) corresponding to an entry number from the title search pointer (TT_SRP) 93 corresponding to the entry number from the key operation/display section 4. When only one title set is present, one title search pointer (TT_SRP) 93 is searched irrespective whether the entry number from the key operation/display section 4 is present or not and the start address (VTS_SA) of the title set is acquired. The system CPU section 50 acquires an object title set based on the start address (VTS_SA) of the title set.

The system CPU section 50 acquires the stream number of video, audio, sub-picture for video manager menu and attribute information items described in the information management table (VMGI_MAT) 78 of the video manager information (VMGI) 75 and sets parameters for reproduction of video manager menu in the video recorder section 58, audio recorder section 60 and sub-picture decoder section 62 based on the attribute information.

Next, as shown in FIG. 12, the video title set information (VTSI) 94 of the title set is acquired from the start address (VTS_SA) of the video title set 72 shown in FIG. 11. The end address (VTI_MAT_EA) of the video title set information management table (VTSI_MAT) 98 shown in FIG. 13 is acquired from the management table (VTSI_MAT) 98 of video title set information of the video title set information (VTSI) 94 and respective portions of the reproducing apparatus shown in FIG. 1 are set according to the attributes thereof based on the numbers of streams (VTS_AST_Ns, VTS_SPST_Ns) of audio and sub-picture data items and attribute information items (VTS_V_ATR, VTS_A_ATR, VTS_SPST_ATR) of video, audio and sub-picture data items.

When the menu (VTSM) for the video title set (VTS) is simple in structure, the start address (VTSM_VOB_SA) of the video object set (VTSM_VOB) 95 for menu in the video title set is acquired from the video title set information management table (VTSI_MAT) 98 shown in FIG. 13 and the menu of the video title set is displayed by the video object set (VTSM_VOB) 95. When the video object set (VTT_VOBS) 96 for the title (VTST) in the tile set (VTS) is simply reproduced by referring to the menu without selecting the program chain (PGC), the video object set 96 is reproduced from the start address (VTSTT_VOB_SA) shown in FIG. 13.

When the program chain (PGC) is specified by the key operation/display section 4, an object program chain is searched for in the following procedure. The procedure of searching for the program chain is not limited to the operation of searching for a program chain for the title in the video title set and the same procedure can be used for searching for a program chain for a relatively complicated menu constructed by program chains. The start address of the program chain information table (VTS_PGCIT) 100 in the video title set (VTS) shown in FIG. 13 and described in the management table (VTSI_MAT) 98 of the video title set information (VTSI) 94 is acquired and information (VTS_PGCIT_I) 102 of the VTS program chain information table shown in FIG. 14 is fetched. The number of program chains (VTS_PGC_Ns) and the end address (VTS_PGCIT_EA) shown in FIG. 15 are acquired from the information (VTS_PGCIT_I) 102.

When the program chain number is specified by the key operation/display section 4, the category of the program chain shown in FIG. 16 from the VTS_PGCIT search pointer (VTS_PGCIT_SRP) 103 shown in FIG. 14 and corresponding to the specified number and the start address of VTS_PGC information 104 corresponding to the search pointer (VTS_PGCIT_SRP) 103 are acquired. The program chain general information (PGC_GI) shown in FIG. 17 is read out by use of the start address (VTS_PGCI_SA). The category of the program chain (PGC) and reproducing time (PGC_CAT, PGC_PB_TIME) are acquired by use of the general information (PGC_GI) and the start addresses (C_PBIT_SA, C_POSIT_SA) of the cell reproduction information table (C_PBIT) and cell position information table (C_POSIT) 108 described in the general information (PGC_GI) are acquired. The identifier (C_VOB_IDN) of the video object and the identifier (C_IDN) of the cell as shown in FIG. 24 are acquired as the cell position information (C_POSI) shown in FIG. 23 by use of the start address (C_PBIT_SA).

Further, cell reproduction information (C_PBI) shown in FIG. 21 is acquired by use of the start address (C_POSIT_SA), the start address (C_FVOBU_SA) of the first VOBU 85 in the cell shown in FIG. 22 and described in the reproduction information (C_PBI) and the start address (C_LVOBU_ SA) of the last VOBU are acquired, and the target cell is searched for. The cell reproduction order is determined by referring to the map of the program shown in FIG. 19 in the PGC program map (PGC_PGMAP) 106 shown in FIG. 17 to sequentially determine the reproduction cell 84. The thus determined data cells 84 of the program chain are sequentially read out from the video object 144 and input to the data RAM section 56 via the system processor section 54. The data cell 84 is supplied to the video decoder section 58, audio decoder section 60 and sub-picture decoder section 62 according to the reproduction time information and decoded, converted by the D/A and reproduction processing section 64, and an image is reproduced on the monitor section 6 and a sound is reproduced from the speaker section 8.

Next, the normal operation of reproducing video data by using the navigation pack 86 is explained in detail with reference to the flowchart.

Figure 48:
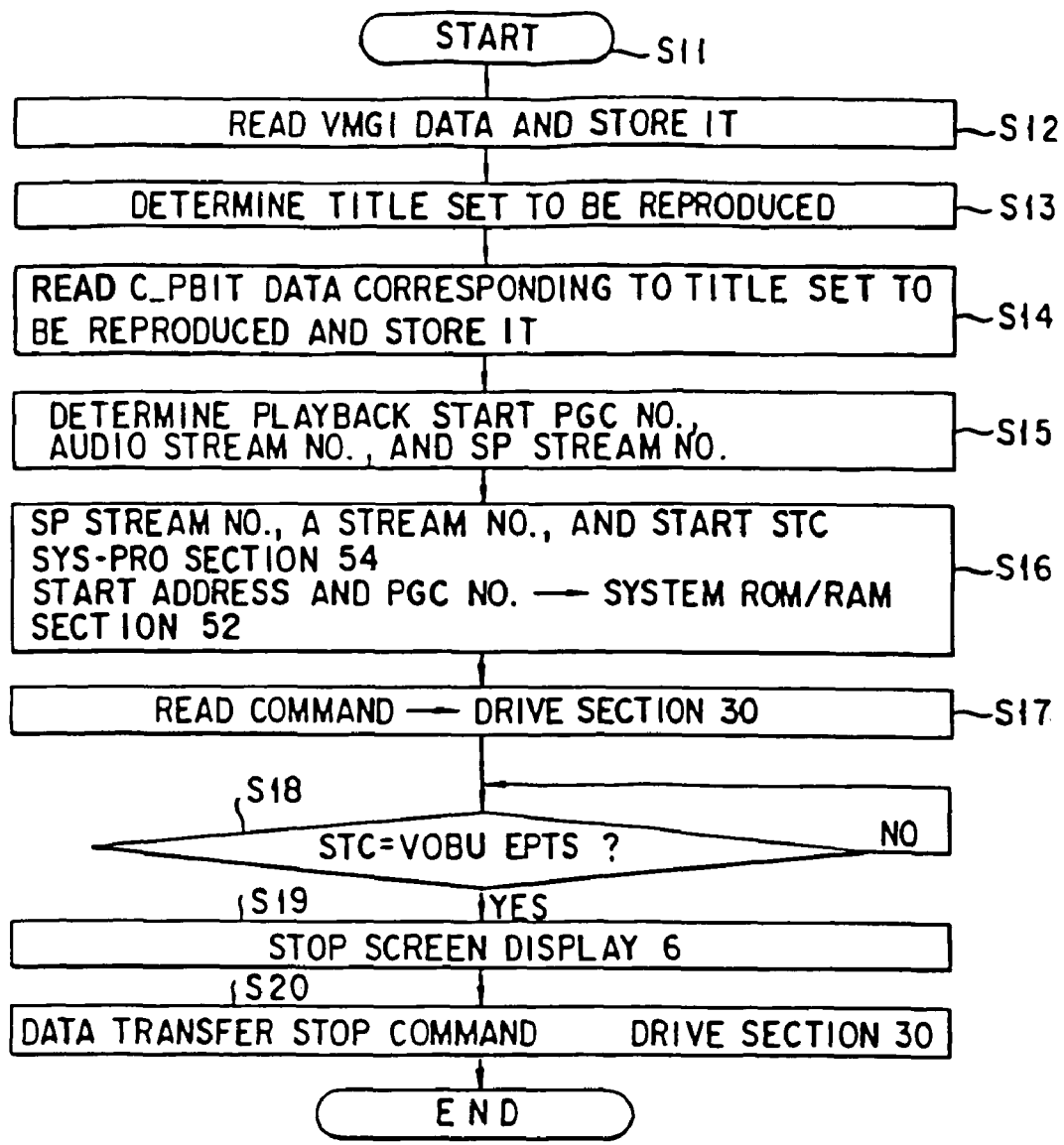
FIG. 48 is a flowchart for illustrating the procedure of a reproduction process for video data, audio data, sub-picture data, and computer data.

In the normal reproduction of video data, when the normal reproduction is started as shown in FIG. 48, the video manager information (VMGI) 75 is searched for by the system CPU section 50 as explained before after the starting step indicated by the step S11 is effected and then it is stored into the system ROM/RAM section 52 by the steps S12. Likewise, the video title set information (VTSI) 94 of the video title set (VTS) 72 is fetched based on the video manager information (VMGI) 75 and the video title set menu is displayed on the monitor section 6 by use of the video object set (VTSM_VOBS) 95. Based on the display, the user determines the title set 72 to be reproduced and the reproduction condition as indicated by the step S13. If the determined title set 72 is selected by the key operation/display section 4, data of the cell reproducing information table (C_PBIT) 107 shown in FIGS. 17, 21, 22 are fetched from the program chain information table (VTS_PGCIT) 100 shown in FIG. 12 in the selected title set 72 by the system CPU section 50 as indicated by the step S14 and stored into the system ROM/RAM section 52.

The system CPU section 50 determines the program chain number (VTS_PGC_Ns), angle number (ANGNs), audio stream number and sub-picture stream number for starting the reproduction according to the reproducing condition input from the key operation/display section 4 by the step S15. For example, the program chain is determined such that the Eleventh World Champion Match of Boxing is selected as the title and the Japanese-caption is used as the sub-picture under the English narration. Further, the user may determine a video image which can always provide favorable observation of the fight between the two boxers as the angle. The thus determined sub-picture number and audio stream number are set in the register 54B of the processor section 54 in the step S16. Likewise, the reproduction start time is set in the system time clock (STC) 54A, 58A, 60A, 62A of the system processor section 54, video decoder section 58, audio decoder section 60 and sub-picture decoder section 62. Further, the start address of first VOBU in the cell used as the start address and the PGC number, that is, cell number are stored in the system ROM/RAM section 52.

A read command is supplied from the system CPU section 50 to the disk drive section 30 when the preparation on for reading the video title set is made as shown in the step S17 and a seek process is effected for the optical disk 10 by the disk drive section 30 based on the received start address. Cells associated with the specified program chain (PGC) are sequentially read out from the optical disk 10 in response to the read command and supplied to the data RAM section 56 via the system CPU section 50 and system processing section 54. The supplied cell data is stored as a pack into the data RAM section 56 from the navigation pack 86 which is the head pack of the video object unit (VOBU) 85 as shown in FIG. 6. After this, the video pack 87, audio pack 91, sub-picture pack 90 and computer data pack 88 of the video object unit (VOBU) 85 are respectively supplied to the video decoder section 58, audio decoder section 60, sub-picture decoder section 62 and data RAM section 56, decoded by the respective decoders and then supplied to the D/A and data reproducing section 64. As a result, a video signal is supplied to the monitor section 6, an audio signal is supplied to the speaker section 8, and display of the video image with the sub-picture is started and voice reproduction is started.

The content of the computer data pack 88 is stored into the work area of the data RAM section 56 for the system CPU section 50.

Then, the system CPU section 50 executes another process by using program data as the computer data or starts another program in the system ROM/RAM section 52.

For example, when Japanese pachisi game is played in the course of video operation, the simple program for the Japanese pachisi game is not recorded in the system ROM/RAM section 52 and is readout as the computer data as described above.

Further, by causing the program to be read out as the computer data, a preset program stored in the system ROM/RAM section 52 is started.

If an interruption from the key operation/display section 4 occurs during the reproduction of video and audio signals, key data obtained at this time is stored into the system RAM/ROM section 52. If no key data is obtained, whether an interruption of the end of reproduction from the drive section is present or not is checked. If the interruption of the end of reproduction is not present, a stand by state for transfer of the navigation pack 86 is set. If transfer of the navigation pack 86 is completed, the logical sector number (NV_PCK_LSN) in the navigation pack 86 is stored into the system RAM/ROM section 52 as the present logical block number (NOWLBN).

When transfer of the NV pack 86 is completed, whether it is the last NV pack 86 in the cell or not is checked. That is, whether it is the last navigation pack 86 in the cell 84 or not is checked. The checking operation is effected by comparing the start address (C_LVOBU_SA) of C_LVOBU of the cell reproduction information table (C_PBI) 107 shown in FIG. 22 with the address (V_PCK_LBN) of the navigation pack 86. If the NV pack 86 is the last one in the cell, whether a change of the angle is made or not is checked. The change of angle is determined based on whether or not a change of angle is entered from the key operation/display section 4 to the system CPU section 50. If no change of angle is made, whether or not the cell is the last cell of the program chain (PGC) to which the cell 84 belongs is checked. The checking operation is effected based on whether or not the cell 84 shown in FIGS. 17 and 21 is the last cell of the cell reproduction information table (C_PBIT) 107. That is, the checking operation is effected based on the number of cells constituting the program chain and the identification number of the reproduced cell. If the end of playback has been specified, or if there is no program chain, the end PTS (VOBU_EPTS) contained in the PCI general information (PCI_GI) is referred to in step S18. When the end PTS (VOBU_EPTS) coincides with the system time clock (STC), the monitor 6 will stop displaying on the screen as shown in step S19, then the system CPU will supply a data transfer stop command to the disk drive section 30, which thereby stops the data transfer terminating the playback operation (step S20).

Figure 49:
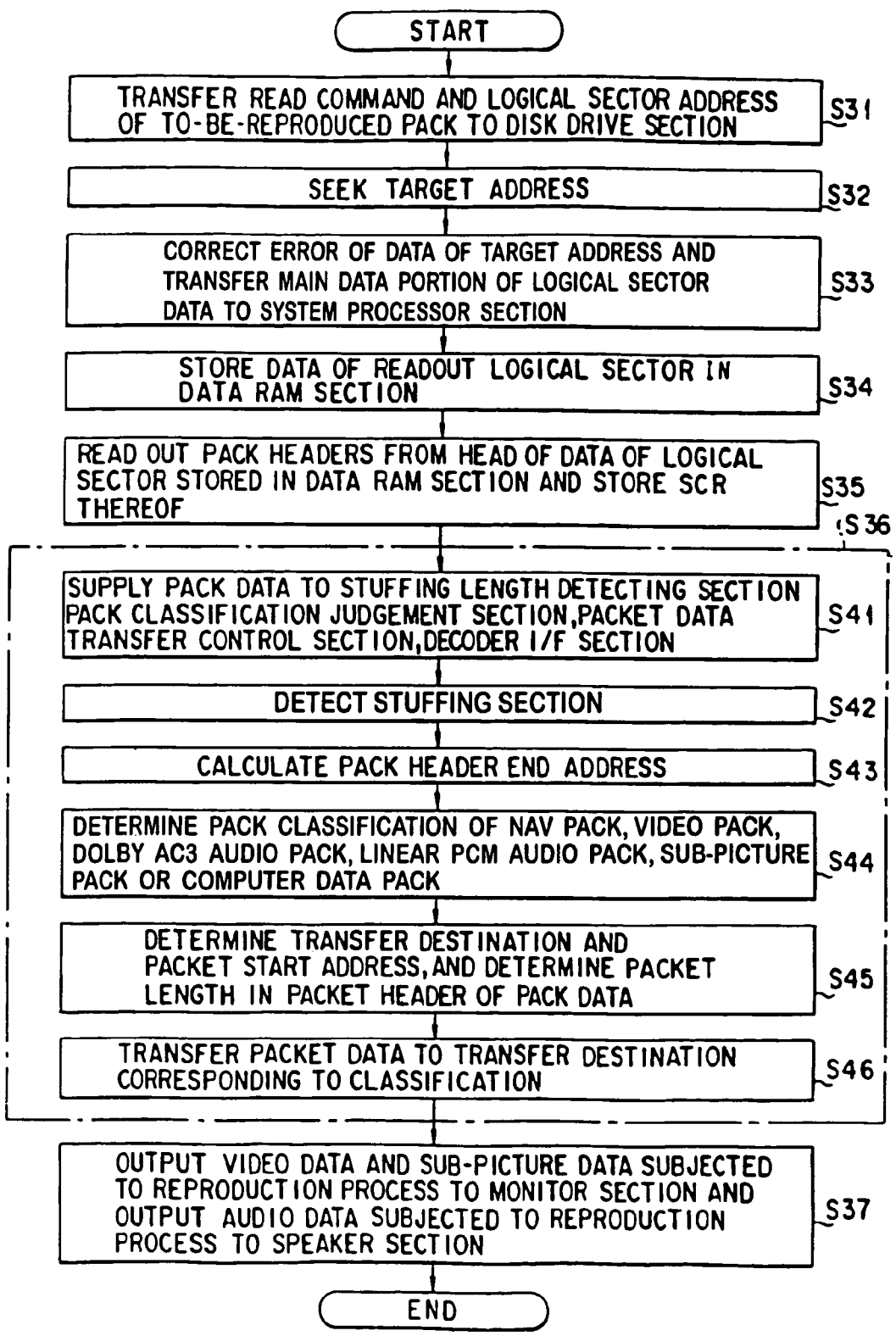
FIG. 49 is a flowchart for illustrating the packet transferring process.

Next, the pack transfer process is explained with reference to the flowchart shown in FIG. 49.

The system CPU section 50 transfers a read command and the logical sector address of a to-be-reproduced pack to the disk drive section 30 (step S31).

Then, the disk drive section 30 seeks a target address (step S32).

The disk drive section 30 corrects an error of data of the target address and transfers main data portion of the logical sector data to the system processor section 54 (step S33).

The system processor section 54 stores data of the readout logical sector in the data RAM section 56 (step S34).

The system processor section 54 reads out pack headers 110, 120 from the head portion of data of the logical sector stored in the data RAM section 56 and stores the SCR (system time standard reference value) thereof (step S35).

At this time, since the head of the logical sector coincides with the head of the pack data, data can be easily fetched.

Then, the system processor section 54 compares the PTS thereof with the SCR of the stored pack, determines a pack corresponding to the SCR which has reached the PTS, that is, to-be-reproduced pack, reads out the determined pack data from the data RAM section 56, determines the classification of data by the packet transfer processing section 200, and transfers data to the decoder section 58, 60, 62 or data RAM section 56 according to the determined classification (step S36).

The decoder sections 58, 60, 62 decode data according to the respective data formats and the set coding system and supplies the decoded data to the D/A & reproduction processing section 64. After a digital signal obtained as the result of decoding of video data is converted into an analog signal by the D/A & reproduction processing section 64, the signal is subjected to the frame rate processing, aspect process, pan-scan process and the like according to the set condition and then output to the monitor section 6. After a digital signal obtained as the result of decoding of audio data is converted into an analog signal by the D/A & reproduction processing section 64 the signal is subjected to the mixing process according to the set condition by the D/A & reproduction processing section 64 and then output to the speaker section 8. After the D/A & reproduction processing section 64 converts a digital signal obtained as the result of decoding of sub-picture data into an analog signal, the signal is output to the monitor section 6 (step S37).

When the data RAM section 56 is supplied with program data as computer data, it stores the data together with the computer environmental classification indicating the application OS and the CPU classification and outputs the computer environmental classification and data thereof to the system CPU section 50.

The above steps S33 to S37 are repeatedly affected until reproduction is completed.

Next, the operation of the packet transfer processing section 200 is explained.

Pack data read out from the data RAM section 56 is supplied to the stuffing length detecting section 202, pack classification judgment section 204, packet data transfer control section 205 and decoder I/F section 206 via the memory I/F section 201 (step S41).

Then, the stuffing length is detected by the stuffing length detecting section 202 and data indicating the stuffing length is output to the pack header end address calculating section 203 (step S42).

The pack header end address calculating section 203 calculates the pack header end address based on the supplied stuffing length and the pack header end address is supplied to the pack classification judgment section 204 and packet data transfer control section 205 (step S43).

The pack classification judgment section 204 determines the NV pack 86, video pack 87, Dolby AC3 audio pack 91, linear PCM audio pack 91, sub-picture pack 90, or computer data pack 88 based on the content of 4-byte to 6-byte data supplied after the pack header end address according to the pack header end address and the result of determination is supplied to the packet data transfer control section 205 (step S44).

That is, when a 1-byte stream ID indicating the private stream 2 is supplied, the NV pack 786 is identified; when a stream ID indicating a video stream is supplied, the video pack 87 is identified; and when a 1-byte stream ID indicating a private stream 1 is supplied, the audio pack 81 of the Dolby AC3, the audio pack 91 of the linear PCM, the audio pack 91, the sub-picture pack 90, or the computer data pack 88 is identified.

In a case where the stream ID is the private stream 1, the linear PCM audio pack is determined if the sub-stream ID (131, 141, 151) following the packet header 121 is "10000xxx", and the stream number is determined by "xxx".

In a case where the stream ID is the private stream 1, the Dolby AC3 audio pack is determined if the sub-stream ID (131, 141, 151) following the packet header 121 is "10000xxx", and the stream number is determined by "xxx".

In a case where the stream ID is the private stream 1, the sub-picture stream is determined if the sub-stream ID (131, 141, 151) following the packet header 121 is "001xxxxx", and the stream number is determined by "xxxxx".

In a case where the stream ID is the private stream 1, the computer data stream is determined if the sub-stream ID (131, 141, 151) following the packet header 121 is "11000000".

When the linear PCM audio pack 91 or Dolby AC3 audio pack 91 is determined, an offset byte number indicating the head position of the first frame is determined by the 2-byte first access unit pointer 133 following the frame header number 132 which is set after the sub-stream ID 131.

Then, the packet data transfer control section 205 determines the transfer destination and packet start address according to the supplied result of determination of the pack classification, pack headed end address and first access unit pointer 133 and determines the packet length in the packet header 121 of the supplied pack data. As a result, the packet data transfer control section 205 supplies a signal indicating the transfer destination as a transfer control signal to the decoder I/F section 206 and the packet end address based on the packet start address is supplied to the memory I/F section 201 (step S45).

Thus, substantially effective data is supplied from the memory I/F section 201 to the decoder I/F section 206 via the data bus, and then, transferred to the decoder 58, 60, 62 or data RAM section 56 as the transfer destination corresponding to the classification (step S46).

That is, the packet data of video data is transferred to the decoder 58, the packet data of audio data is transferred to the decoder 60, the packet data of sub-picture data is transferred to the decoder 62, and the packet data of computer data is transferred to the date RAM section 56.

In this case, since the pack data has a constant length and the storage state in the data RAM section 56 is made uniform, that is, the start addresses are set at regular intervals, the heads of the pack data items in the data RAM section 56 are always stored at the addresses set at regular intervals, and therefore, the management of the pack data can be attained only by managing the pack number without managing the address.

In a case where data is DSI data and PCI data as NV data indicating the reproduction position of video data, the NV data is not transferred to the decoder in the process of determination of the classification of data, and the NV data is stored in the data RAM section 56. The NV data is referred to by the system CPU section 50 when required and used to reproduce video data in a special way. At this time, the PCI data and DSI data are identified by the sub-stream ID attached thereto.

Further, when reproduction of one cell is completed, cell information to be next reproduced is acquired from cell reproduction order information in the program chain data and the reproducing process is affected in the same manner as described above.

Next, the video data in the logic formats shown in FIGS. 4 to 31, a method of recording data on the optical disk 10 to reproduce the video data, and a recording system to which the recording method is applied will be explained with reference to, FIGS. 50 to 55.

FIG. 50 shows an encoder system that creates a video file of a title set 84 in which the video data is encoded. In the system of FIG. 50, for example, a videotape recorder (VTR) 201, an audiotape recorder (ATR) 202, a sub-picture source 203 and a computer data source 204 are used as sources of the main video data, the audio data, the sub-picture data and computer data. Under the control of a system controller (Sys con) 205, they create the main video data, audio data, and sup-picture data, which are supplied to a video encoder (VENC) 206, an audio encoder (AENC) 207, a sub-picture encoder (SPENC) 208, and a computer data encoder (CENC) 209, respectively. Under the control of the system controller (Sys con) 205, these encoders 206, 207, 208, and 209 perform A/D conversion of the main video data, audio data, and sup-picture data and encode them by the respective compression schemes. The encoded main video data, audio data, and sub-picture data (Comp Video, Comp Audio, Com Sub-pict, Comp Computer) are stored in memories 210, 211, 212, and 213. The main video data, audio data, and sub-picture data (Comp Video, comp Audio, Com Sub-pict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process sin the system controller (Sys con) 205 that creates a file from video data.

According to the flow of FIG. 51, the main video data and the audio data are encoded and the encoded main video data and audio data (Comp Video, Comp Audio) are supplied. Specifically, when the encoding process is started, as shown in step S50 of FIG. 51, the parameters necessary for encoding the main video data and audio data are set. Part of the set parameters are stored in the system controller (Sys con) 205 and at the same time, are used at the file formatter (FFMT) 214. As shown in step S51, the main video data is pre-encoded using the parameters and the optimum distribution of the amount of codes is calculated. Then, on the basis of the code amount distribution obtained in the pre-encoding, the main video data is encoded as shown in step S52. At the same time, the audio data is also encoded at step S52. As shown in step S53, if necessary, the main video data is partially encoded again and the reencoded portion of the main video data is replaced with the old one. Through the series of steps, the main video data and audio data are encoded. Furthermore, as shown in steps S54 and S55, the sub-picture data is encoded and the encoded sub-picture data (Comp Sub-pict) is supplied. Namely, the parameters necessary for encoding the sub-picture data is set. As shown in step S54, part of the parameters are stored in the system controller (Sys con) 205 and used in the file formatter (FFMT) 1214. On the basis of the parameters, the sub-picture data is encoded. By the process, the sup-picture data is encoded.

Furthermore, as shown in steps S56 and S57, the computer data is encoded and the encoded computer data (Comp Computer) is supplied. Namely, the parameters necessary for encoding the computer data is set. As shown in step S56, part of the parameters are stored in the system controller (Sys con) 205 and used in the file formatter (FFMT) 214. On the basis of the parameters, the computer data is encoded. By the process, the computer data is encoded.

According to the flow of FIG. 52, the encoded main video data, audio data, sup-picture data, and computer data (Com Video, Com Audio, Comp Sub-pict, Comp Computer) are combined and converted so as to form a video data title set structure as explained in FIGS. 4 and 12. Specifically, as shown in step S61, a cell is set as the smallest unit of the video data and cell playback information on a cell (C_PBI) is created. Then, as shown in step S62, the structure of the cells constituting a program chain and the main video, sub-picture, and audio attributes (the information obtained in encoding the respective data items are used part of these attributes) are set and the video title set information management table information (VTSI_MAT) 98 containing information on a program chain and a video title set time search map table (VTS_MAPT) 101 are created. At this time, as the need arises, a video title set direct access pointer table (VTS_DAPT) is also created. Then, as shown in step S63, the encoded main video data, audio data, sup-picture data, and computer data (Com Video, Comp Audio, Comp Sup-pict, Comp Computer) are subdivided into specific packs. An NAV pack 86 is placed at the head of each VOBU unit so that playback can be affected in the order of time code of each data item. With the NV packs 86 arranged this way, each data cell is positioned so that a video object (VOB) may be composed of a plurality of cells as shown in FIG. 6. A set of such video objects is formatted into the title set structure.

In the flow of FIG. 52, the program chain information (PGI) is obtained in the process of step S62 by using the database in the system controller (Sys con) 205 or entering data again as the need arises.

FIG. 53 shows a disk formatter system that records on an optical disk the title set formatted as described above. In the disk formatter system of FIG. 53, the memories 220, 222 in which the created title set is stored supply these file data items to a volume formatter (VFMT) 226. In the volume formatter (VFMT) 226 extracts the management information from the title sets 84, 86, produces a video manager 71, and create the logic data to be recorded on the disk 10 in the arrangement of FIG. 4. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

Figure 54:
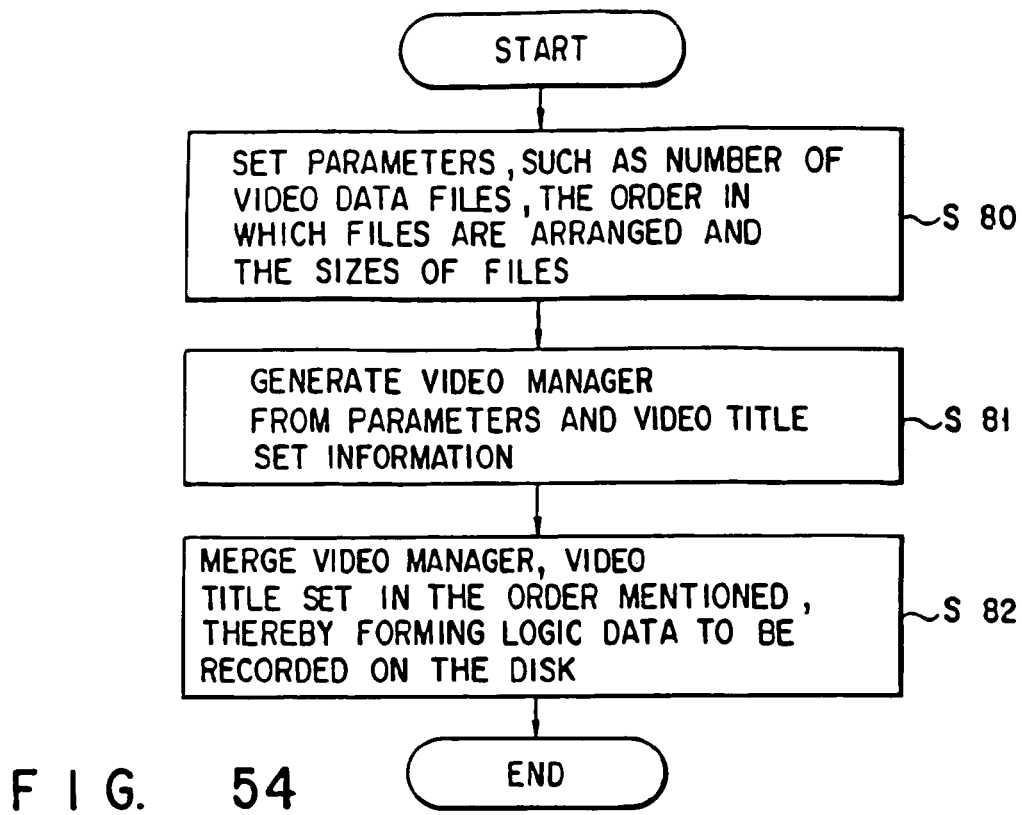
FIG. 54 is a flowchart for creating logic data to be recorded on a disk in the disk formatter of FIG. 53.

A standard flow for creating the aforementioned disk will be described with reference to FIGS. 54 and 55. FIG. 54 shows the flow for creating the logic data to be recorded on the disk 10. Specifically, as shown in step S80, parameter data items, including the number of video data files, their arrangement, and the size of each video data file, are set first. Next, in step S81 video manager 71 is generated from the parameters set and the video title set information 94 of each video title set 72. In step S82, the video manager 71 and the video tile set 71 are arranged in the order mentioned, according to their logic block numbers, thereby generating logic data which is to be recorded on the disk 10.

Figure 55:
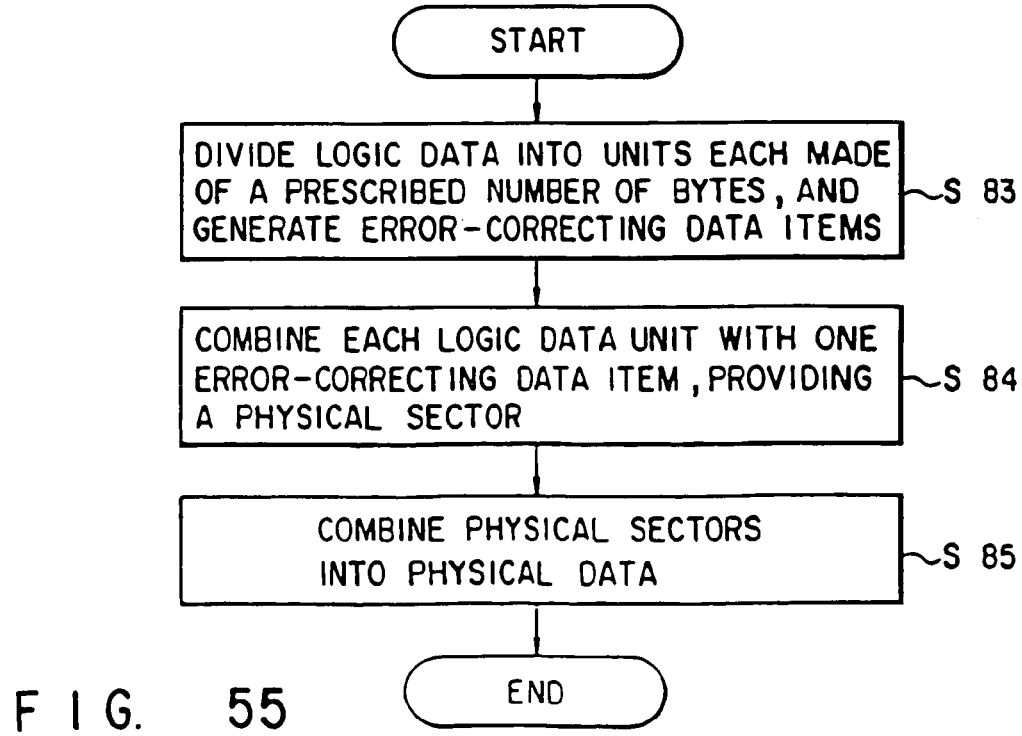
FIG. 55 is a flowchart for creating from the logic data the physical data to be recorded on a disk.

Thereafter, the flow for creating the physical data to be recorded on the disk as shown in FIG. 55 is executed. Specifically, as shown in step S83 the logic data is divided into units of a specific number of bytes, thereby forming error correction data. Next, as shown in step S84, the logic data divided into units of a specific number of bytes are combined with the created error correction data to form physical sectors. Thereafter, as shown in step S85, physical data is created by combining physical sectors. In this way, the modulating process based on certain rules is performed on the physical data created in the flow of FIG. 55, thereby forming the recording data. Thereafter, the recording data is recorded on the disk 10.

The above-described data structure can be applied not only to a case where the data is recorded on recording mediums, such as optical disks, and then the disks are distributed to the users, but also to a communication system as shown in FIG. 56. Specifically, according to the procedure shown in FIGS. 50 to 53, an optical disk 10 in which a video manager 71 and video title set 72 as shown in FIG. 4 may be loaded into a reproducing unit 300, from whose system CPU section 50 the encoded data is taken out digitally and transmitted by the modulator/transmitter 310 to the users or the cable subscribers by radio or via a cable. Furthermore, the encoding system 320 shown in FIGS. 50 and 53 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing unit on the user or subscriber side of FIG. 1 in the same manner as in the above-described reproducing process, whereby the video data is reproduced.

In transferring the video title set 72, the video object sets 95, 96 are transferred using the video object unit 85 of FIG. 6 as a unit. At the head of the video object unit 85, an NAV pack 86 containing video playback and search information is arranged. Furthermore, because the NAV pack contains the addresses of the video object units to be reproduced immediately before and after the video object unit 85 to which the NAV pack 86 belongs, even if the video object unit 85 is lost during transfer for some reason, the video object can be reproduced reliably on the user side by requesting the lost video object unit 85 to be transmitted again. Furthermore, even if transfer is not carried out in the order of playback of video object units, because the system ROM/RAM section 52 on the user side holds the accurate playback information on program chains, the system CPU section 50 can specify the order of playback referring to the address data in its NAV pack.

While in the above explanation, the video object unit is a data train containing video data, audio data, and sub-picture data, the video object unit may be composed of audio packs only or sup-picture packs only, because the video object unit has only to contain any one of video data, audio data, sub picture data, and computer data.

As described above, data is stored in the data area of the disk in the hierarchical structure of program chains, programs, cells and packs, each pack is constructed by a pack header for identifying the pack and a packet having a data stream recorded therein, and the packet is constructed by a packet header having data indicating at least a private stream, data indicating the classification of the private stream, and packet data corresponding to the classification.

Thus, a plurality of various classification data items can be dealt with.

Further, when data to be dealt with is Dolby AC3 audio data or linear PCM audio data, reproduction started halfway can be smoothly effected, and when the data is computer data, the environment in which the data can be used can be easily detected. In the above embodiment, a case wherein the optical disk of high-density recording type is used as the recording medium is explained, but this invention can be applied to another recording medium other than the optical disk, for example, a magnetic disk or another recording medium physically recordable with high density.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium, readable by a machine, tangibly embodying a package of data for access by an application mechanism, said package comprising:

a video title set including video title set information for the video title set and a video object set for the video title set, the video object set being produced, the video object set comprising a video object which includes an arrangement of cells having cell identifiers which identify the respective cells, each cell being composed of video object units, each of the video object units including a video stream, an audio stream having a stream number and a sub-picture stream having a stream number, each of the video object units being composed of a sequence of data packs, the sequence of data packs including a video pack, an audio pack, a sub-picture pack and a navigation pack placed at the head of the sequence, the video pack including a pack header and a video packet having a first stream identifier and a video data constituting a part of the video stream, the first stream identifier defining that the part of the video stream belongs to a MPEG video stream, the audio pack including a pack header and an audio packet having a second stream identifier or a combination of a third stream identifier and a first sub-stream identifier and an audio data constituting a part of the audio stream, the second stream identifier defining that the part of the audio stream belongs to a MPEG audio stream, the third stream identifier a first private stream, and the first sub-stream identifier defining that the first private stream corresponds to the audio stream which belongs to a predetermined one other than the MPEG audio stream and specifying the stream number of the audio stream, the sub-picture pack including a pack header and a sub-picture packet having a combination of the third stream identifier and a second sub-stream identifier and a sub-picture data constituting a part of the sub-picture stream, the second sub-stream identifier defining that the first private stream corresponds to the sub-picture stream and specifying the stream number of the sub-picture stream, the navigation pack comprising a pack header, a presentation control information packet and a data search information packet, the presentation control information packet including a combination of a fifth stream identifier and the third sub-stream identifier, and presentation control information data which corresponds to navigation data to control a presentation of the video object unit, the data search information packet including a combination of a fourth stream identifier and a third sub-stream identifier and data search information data which corresponds to the navigation data to search the video object unit, wherein the fourth stream identifier identifies a second private stream, the third and fourth sub-stream identifiers defining that the second private stream corresponds to the presentation control information data and that the second private stream corresponds to the data search information data, and the video title set information comprising a video title set program chain information table which includes program chain information defining a program chain and a search pointer for searching the program chain information, wherein the program chain information includes a cell playback table which defines a playback order of the cells in the program chain and in which cell playback information is continuously described, cell numbers being assigned in the order of the cell playback information, the cell playback information including a cell start address of the first video object unit in the cell and a start address of the last video object unit in the cell, and a cell position information table in which cell position information corresponding to the cell number defined in the cell playback information table is described in a same order as that of the cell playback information in the cell playback information table, the video object identifier and the cell identifier are described in the cell position information.

2. A method of reproducing cells from a recording medium, said method comprising:

providing the recording medium, readable by a machine, tangibly embodying a package of data for access by an application mechanism, said package comprising:

a video title set including video title set information for the video title set and a video object set for the video title set, the video object set being produced, the video object set comprising a video object which includes an arrangement of cells having cell identifiers which identify the respective cells, each cell being composed of video object units, each of the video object units including a video stream, an audio stream having a stream number and a sub-picture stream having a stream number, each of the video object units being composed of a sequence of data packs, the sequence of data packs including a video pack, an audio pack, a sub-picture pack and a navigation pack placed at the head of the sequence, the video pack including a pack header and a video packet having a first stream identifier and a video data constituting a part of the video stream, the first stream identifier defining that the part of the video stream belongs to a MPEG video stream, the audio pack including a pack header and an audio packet having a second stream identifier or a combination of a third stream identifier and a first sub-stream identifier and an audio data constituting a part of the audio stream, the second stream identifier defining that the part of the audio stream belongs to a MPEG audio stream, the third stream identifier a first private stream, and the first sub-stream identifier defining that the first private stream corresponds to the audio stream which belongs to a predetermined one other than the MPEG audio stream and specifying the stream number of the audio stream, the sub-picture pack including a pack header and a sub-picture packet having a combination of the third stream identifier and a second sub-stream identifier and a sub-picture data constituting a part of the sub-picture stream, the second sub-stream identifier defining that the first private stream corresponds to the sub-picture stream and specifying the stream number of the sub-picture stream, the navigation pack comprising a pack header, a presentation control information packet and a data search information packet, the presentation control information packet including a combination of a fifth stream identifier and the third sub-stream identifier, and presentation control information data which corresponds to navigation data to control a presentation of the video object unit, the data search information packet including a combination of a fourth stream identifier and a third sub-stream identifier and data search information data which corresponds to the navigation data to search the video object unit, wherein the fourth stream identifier identifies a second private stream, the third and fourth sub-stream identifiers defining that the second private stream corresponds to the presentation control information data and that the second private stream corresponds to the data search information data, and the video title set information comprising a video title set program chain information table which includes program chain information defining a program chain and a search pointer for searching the program chain information, wherein the program chain information includes a cell playback table which defines a playback order of the cells in the program chain and in which cell playback information is continuously described, cell numbers being assigned in the order of the cell playback information, the cell playback information including a cell start address of the first video object unit in the cell and a start address of the last video object unit in the cell, and a cell position information table in which cell position information corresponding to the cell number defined in the cell playback information table is described in a same order as that of the cell playback information in the cell playback information table, the video object identifier and the cell identifier are described in the cell position information; and transferring the video object units in the acquired cells with utilizing the data search information data, and converting the video, audio and sub-picture streams in the video, audio and sub-picture packs into video, audio and sub-picture signals.

3. An apparatus for reproducing cells from a recording medium which comprises:

a video title set including video title set information for the video title set and a video object set for the video title set, the video object set being produced, the video object set comprising a video object which includes an arrangement of cells having cell identifiers which identify the respective cells, each cell being composed of video object units, each of the video object units including a video stream, an audio stream having a stream number and a sub-picture stream having a stream number, each of the video object units being composed of a sequence of data packs, the sequence of data packs including a video pack, an audio pack, a sub-picture pack and a navigation pack placed at the head of the sequence, the video pack including a pack header and a video packet having a first stream identifier and a video data constituting a part of the video stream, the first stream identifier defining that the part of the video stream belongs to a MPEG video stream, the audio pack including a pack header and an audio packet having a second stream identifier or a combination of a third stream identifier and a first sub-stream identifier and an audio data constituting a part of the audio stream, the second stream identifier defining that the part of the audio stream belongs to a MPEG audio stream, the third stream identifier a first private stream, and the first sub-stream identifier defining that the first private stream corresponds to the audio stream which belongs to a predetermined one other than the MPEG audio stream and specifying the stream number of the audio stream, the sub-picture pack including a pack header and a sub-picture packet having a combination of the third stream identifier and a second sub-stream identifier and a sub-picture data constituting a part of the sub-picture stream, the second sub-stream identifier defining that the first private stream corresponds to the sub-picture stream and specifying the stream number of the sub-picture stream, the navigation pack comprising a pack header, a presentation control information packet and a data search information packet, the presentation control information packet including a combination of a fifth stream identifier and the third sub-stream identifier, and presentation control information data which corresponds to navigation data to control a presentation of the video object unit, the data search information packet including a combination of a fourth stream identifier and a third sub-stream identifier and data search information data which corresponds to the navigation data to search the video object unit, wherein the fourth stream identifier identifies a second private stream, the third and fourth sub-stream identifiers defining that the second private stream corresponds to the presentation control information data and that the second private stream corresponds to the data search information data, and the video title set information comprising a video title set program chain information table which includes program chain information defining a program chain and a search pointer for searching the program chain information, wherein the program chain information includes a cell playback table which defines a playback order of the cells in the program chain and in which cell playback information is continuously described, cell numbers being assigned in the order of the cell playback information, the cell playback information including a cell start address of the first video object unit in the cell and a start address of the last video object unit in the cell, and a cell position information table in which cell position information corresponding to the cell number defined in the cell playback information table is described in a same order as that of the cell playback information in the cell playback information table, the video object identifier and the cell identifier are described in the cell position information; and transferring means for transferring the video object units in the acquired cells with utilizing the data search information data, and converting the video, audio and sub-picture streams in the video, audio and sub-picture packs into video, audio and sub-picture signals.

4. A recording method comprising:

creating a video title set including video title set information for the video title set and a video object set for the video title set, the video object set being produced, the video object set comprising a video object which includes an arrangement of cells having cell identifiers which identify the respective cells, each cell being composed of video object units, each of the video object units including a video stream, an audio stream having a stream number and a sub-picture stream having a stream number, each of the video object units being composed of a sequence of data packs, the sequence of data packs including a video pack, an audio pack, a sub-picture pack and a navigation pack placed at the head of the sequence, the video pack including a pack header and a video packet having a first stream identifier and a video data constituting a part of the video stream, the first stream identifier defining that the part of the video stream belongs to a MPEG video stream, the audio pack including a pack header and an audio packet having a second stream identifier or a combination of a third stream identifier and a first sub-stream identifier and an audio data constituting a part of the audio stream, the second stream identifier defining that the part of the audio stream belongs to a MPEG audio stream, the third stream identifier a first private stream, and the first sub-stream identifier defining that the first private stream corresponds to the audio stream which belongs to a predetermined one other than the MPEG audio stream and specifying the stream number of the audio stream, the sub-picture pack including a pack header and a sub-picture packet having a combination of the third stream identifier and a second sub-stream identifier and a sub-picture data constituting a part of the sub-picture stream, the second sub-stream identifier defining that the first private stream corresponds to the sub-picture stream and specifying the stream number of the sub-picture stream, the navigation pack comprising a pack header, a presentation control information packet and a data search information packet, the presentation control information packet including a combination of a fifth stream identifier and the third sub-stream identifier, and presentation control information data which corresponds to navigation data to control a presentation of the video object unit, the data search information packet including a combination of a fourth stream identifier and a third sub-stream identifier and data search information data which corresponds to the navigation data to search the video object unit, wherein the fourth stream identifier identifies a second private stream, the third and fourth sub-stream identifiers defining that the second private stream corresponds to the presentation control information data and that the second private stream corresponds to the data search information data, and the video title set information comprising a video title set program chain information table which includes program chain information defining a program chain and a search pointer for searching the program chain information, wherein the program chain information includes a cell playback table which defines a playback order of the cells in the program chain and in which cell playback information is continuously described, cell numbers being assigned in the order of the cell playback information, the cell playback information including a cell start address of the first video object unit in the cell and a start address of the last video object unit in the cell, and a cell position information table in which cell position information corresponding to the cell number defined in the cell playback information table is described in a same order as that of the cell playback information in the cell playback information table, the video object identifier and the cell identifier are described in the cell position information; and recording the video title set on the recording medium.

5. A recording apparatus comprising:

creating means for creating a video title set including video title set information for the video title set and a video object set for the video title set, the video object set being produced, the video object set comprising a video object which includes an arrangement of cells having cell identifiers which identify the respective cells, each cell being composed of video object units, each of the video object units including a video stream, an audio stream having a stream number and a sub-picture stream having a stream number, each of the video object units being composed of a sequence of data packs, the sequence of data packs including a video pack, an audio pack, a sub-picture pack and a navigation pack placed at the head of the sequence, the video pack including a pack header and a video packet having a first stream identifier and a video data constituting a part of the video stream, the first stream identifier defining that the part of the video stream belongs to a MPEG video stream, the audio pack including a pack header and an audio packet having a second stream identifier or a combination of a third stream identifier and a first sub-stream identifier and an audio data constituting a part of the audio stream, the second stream identifier defining that the part of the audio stream belongs to a MPEG audio stream, the third stream identifier a first private stream, and the first sub-stream identifier defining that the first private stream corresponds to the audio stream which belongs to a predetermined one other than the MPEG audio stream and specifying the stream number of the audio stream, the sub-picture pack including a pack header and a sub-picture packet having a combination of the third stream identifier and a second sub-stream identifier and a sub-picture data constituting a part of the sub-picture stream, the second sub-stream identifier defining that the first private stream corresponds to the sub-picture stream and specifying the stream number of the sub-picture stream, the navigation pack comprising a pack header, a presentation control information packet and a data search information packet, the presentation control information packet including a combination of a fifth stream identifier and the third sub-stream identifier, and presentation control information data which corresponds to navigation data to control a presentation of the video object unit, the data search information packet including a combination of a fourth stream identifier and a third sub-stream identifier and data search information data which corresponds to the navigation data to search the video object unit, wherein the fourth stream identifier identifies a second private stream, the third and fourth sub-stream identifiers defining that the second private stream corresponds to the presentation control information data and that the second private stream corresponds to the data search information data, and the video title set information comprising a video title set program chain information table which includes program chain information defining a program chain and a search pointer for searching the program chain information, wherein the program chain information includes a cell playback table which defines a playback order of the cells in the program chain and in which cell playback information is continuously described, cell numbers being assigned in the order of the cell playback information, the cell playback information including a cell start address of the first video object unit in the cell and a start address of the last video object unit in the cell, and a cell position information table in which cell position information corresponding to the cell number defined in the cell playback information table is described in a same order as that of the cell playback information in the cell playback information table, the video object identifier and the cell identifier are described in the cell position information; and recording means for recording the video title set on the recording medium.

* * * * *